(12) United States Patent
Chen et al.

(10) Patent No.: US 10,071,521 B2
(45) Date of Patent: Sep. 11, 2018

(54) METHOD AND APPARATUS FOR PROCESSING DIELECTRIC MATERIALS USING MICROWAVE ENERGY

(71) Applicant: MKS Instruments, Inc., Andover, MA (US)

(72) Inventors: Xing Chen, Lexington, MA (US); David Lam, Fitchburg, MA (US); Kevin W. Wenzel, Belmont, MA (US); Ilya Pokidov, Wincester, MA (US)

(73) Assignee: MKS Instruments, Inc., Andover, MA (US)

( * ) Notice: Subject to any disclaimer, the term of this patent is extended or adjusted under 35 U.S.C. 154(b) by 140 days.

(21) Appl. No.: 14/978,091

(22) Filed: Dec. 22, 2015

(65) Prior Publication Data

US 2017/0173846 A1    Jun. 22, 2017

(51) Int. Cl.
*B29C 49/64* (2006.01)
*B29B 13/02* (2006.01)
(Continued)

(52) U.S. Cl.
CPC ............ *B29C 49/64* (2013.01); *B29B 13/024* (2013.01); *B29C 35/0805* (2013.01);
(Continued)

(58) Field of Classification Search
CPC ............................. B29C 49/64; B29B 13/024
See application file for complete search history.

(56) References Cited

U.S. PATENT DOCUMENTS

| 3,830,893 A | 8/1974 | Steingiser |
| 4,392,039 A * | 7/1983 | Risman ................. H05B 6/705 219/691 |

(Continued)

FOREIGN PATENT DOCUMENTS

| DE | 102010055188 A1 | 7/2012 |
| EP | 1868785 A1 | 12/2007 |

(Continued)

OTHER PUBLICATIONS

Erbulut, D. U., et al. "Preheating of a poly (ethylene terephthalate) preform for stretch blow molding using microwaves." Journal of applied polymer science 112.3 (2009): 1670-1679.*

(Continued)

*Primary Examiner* — Edmund H Lee
*Assistant Examiner* — Nicholas R Krasnow
(74) *Attorney, Agent, or Firm* — Proskauer Rose LLP

(57) ABSTRACT

Methods and systems are provided for heating a dielectric preform material. An exemplary method includes inserting the preform material into a microwave cavity along a longitudinal axis of the microwave cavity and supplying the microwave cavity with microwave power having a frequency that corresponds to an axial wavelength along the longitudinal axis of the microwave cavity. The axial wavelength is greater than a length of the preform material along the longitudinal axis. The method includes heating the preform material within the microwave cavity by the microwave power and determining temperatures of the preform material at one or more locations on a surface of the preform material. The method further includes adjusting, based on the temperatures of the preform material, the microwave frequency to achieve substantially uniform heating at least on a sidewall of the preform material along the longitudinal axis.

18 Claims, 13 Drawing Sheets

(51) Int. Cl.
*B29C 35/08* (2006.01)
*H05B 6/64* (2006.01)
*B29K 67/00* (2006.01)
*B29L 31/00* (2006.01)

(52) U.S. Cl.
CPC ....... *B29C 49/6418* (2013.01); *H05B 6/6402* (2013.01); *B29C 2035/0855* (2013.01); *B29K 2067/003* (2013.01); *B29L 2031/712* (2013.01)

(56) References Cited

U.S. PATENT DOCUMENTS

| | | | | |
|---|---|---|---|---|
| 5,721,286 | A * | 2/1998 | Lauf | ............ H05B 6/686 522/1 |
| 6,952,949 | B2 | 10/2005 | Moore et al. | |
| 6,984,352 | B1 * | 1/2006 | Akopyan | ............ B29C 33/3828 264/219 |
| 7,091,457 | B2 | 8/2006 | Gregoire et al. | |
| 7,163,655 | B2 | 1/2007 | Weber et al. | |
| 8,231,823 | B2 | 7/2012 | Humele et al. | |
| 8,517,711 | B2 | 8/2013 | Winzinger | |
| 8,629,379 | B2 | 1/2014 | Senn et al. | |
| 8,664,574 | B2 | 3/2014 | Senn et al. | |
| 2009/0230124 | A1 | 9/2009 | Senn | |
| 2010/0052224 | A1 | 3/2010 | Humele et al. | |
| 2010/0181309 | A1 | 7/2010 | Senn et al. | |
| 2011/0084064 | A1 | 4/2011 | Zimmerer et al. | |
| 2011/0253708 | A1 | 10/2011 | Zimmerer et al. | |
| 2011/0272861 | A1 | 11/2011 | Humele | |
| 2012/0080816 | A1 | 4/2012 | Senn | |
| 2013/0270747 | A1 * | 10/2013 | Tranter | ............ B29C 51/14 264/480 |

FOREIGN PATENT DOCUMENTS

| | | | | |
|---|---|---|---|---|
| EP | 2100712 | A2 | 9/2009 | |
| EP | 2647485 | A1 | 10/2013 | |
| EP | 2743057 | A1 | 6/2014 | |
| GB | 1380447 | A | 1/1975 | |
| WO | WO 2004067262 | A1 * | 8/2004 | ........ A61M 25/1029 |
| WO | 2007131701 | A2 | 11/2007 | |
| WO | 2010063686 | A2 | 6/2010 | |
| WO | 2012146870 | A1 | 11/2012 | |

OTHER PUBLICATIONS

Linn, Horst, and Malte Möller. "3 Dielectric heating." (<https://www.linn-high-therm.de/fileadmin/user_upload/pages/about_us/download/publications/white_papers/>) Note: equivalent to Suhm, Jurgen, and Malte Moller. "Dielectric heating." Handbook of Thermoprocessing Technologies (2005): 196-206.*

Meredith, R.J., 1983. Industrial microwave heating (No. 4). IET. ISBN 0-90604-889-3 Chapter 3 and Chapter 7 (Year: 1983).*

Kybartas, D., Ibenskis, E. and Surna, R., 2011. Single mode circular waveguide applicator for microwave heating of oblong objects in food research. Elektronika ir Elektrotechnika, 114(8), pp. 79-82. <http://www.eejournal.ktu.It/index.php/eIt/article/view/701> (Year: 2011).*

Lin, H.H., 1989. Theoretical formulation and experimental investigation of a cylindrical cavity loaded with lossy dielectric materials (Doctoral dissertation, Michigan State University. Department of Electrical Engineering and System Science). (Year: 1989).*

* cited by examiner

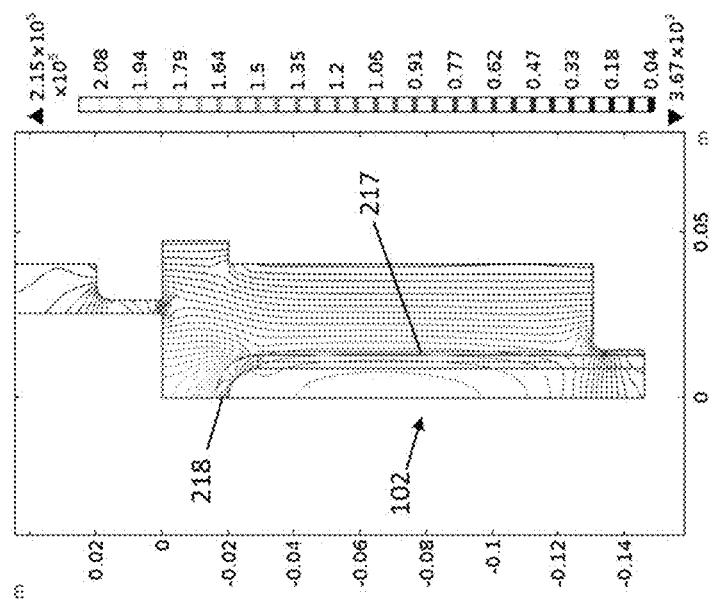
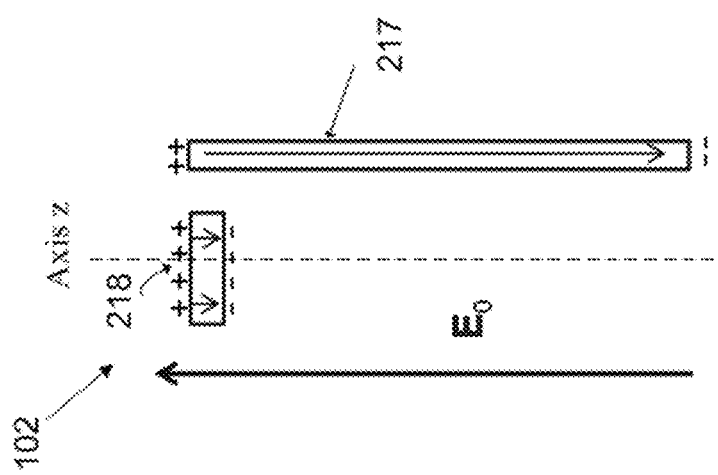
FIG. 5b
FIG. 5a

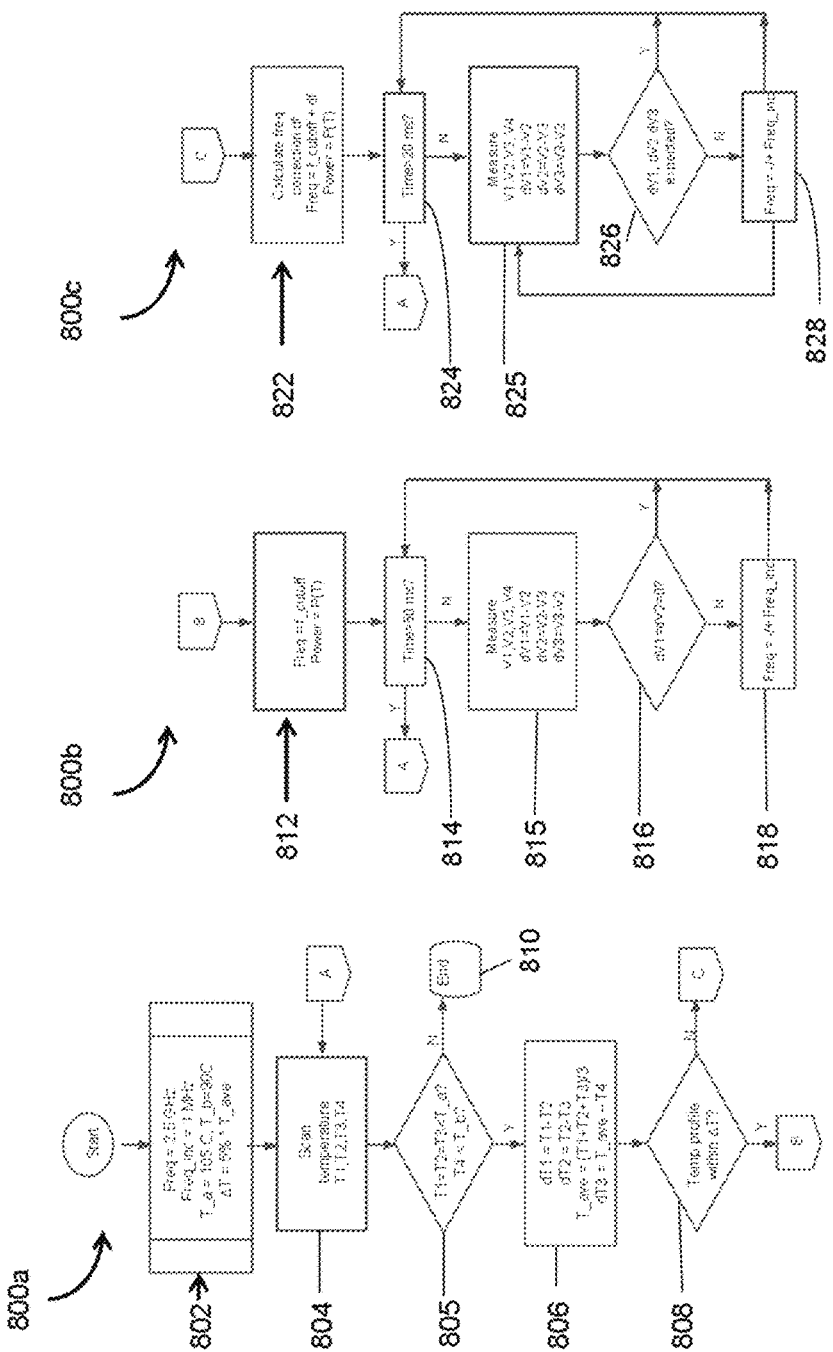

METHOD AND APPARATUS FOR PROCESSING DIELECTRIC MATERIALS USING MICROWAVE ENERGY

FIELD OF THE INVENTION

The invention generally relates to processing dielectric materials using microwave energy and, more particularly, to heating dielectric materials having dielectric properties that can change with temperature during heating.

BACKGROUND

Frequently, in the production of thermoplastic containers, such as polyethylene terephthalate (PET) bottles, preforms are first heated and subsequently molded (e.g., via injection molding or stretching blow molding) to form containers of the desired shapes. The heating operation is usually performed with infrared radiation or near-infrared radiation, which is associated with low energy efficiency, typically at approximately 10-15%. Hence, duration for infrared heating can be long, usually on the order of minutes. In contrast, heating preforms with microwave radiation can have higher energy efficiency (e.g., at approximately 30-50%), which can dramatically reduce energy cost in comparison to the use of infrared heating.

Microwave-based heating apparatuses for plastic preforms are known, such as the apparatuses described in U.S. Pat. Nos. 6,952,949, 7,163,655, 8,231,823, 8,517,711 and 8,629,379. These microwave devices, however, cannot heat a preform substantially uniformly without mechanically moving a preform linearly and/or rotationally during microwave heating. A disadvantage associated with such a device is that by heating a portion of the preform at a time, the production throughput is greatly reduced. In addition, the mechanical movement increases the complexity and cost of the preform heating devices. Furthermore, no existing devices can provide relatively uniform and efficient heating of a preform with non-uniform thickness or geometry, which exists in almost all preforms.

SUMMARY

The present invention provides a system and method for using microwave energy to heat preforms of dielectric materials with increased energy efficiency prior to molding the preforms into the desired shapes. The present invention can also increase the heating rate and throughput while reducing or eliminating mechanical maneuvering of the preforms during the microwave heating process. In addition, the present invention can provide precise temperature control to enable temperature uniformity during heating and minimize electric field peaking in the microwave cavity to eliminate arcing, thereby improving overall system robustness.

In one aspect, a method for heating a dielectric preform material is provided. The method includes inserting the preform material into a microwave cavity along a longitudinal axis of the microwave cavity and supplying the microwave cavity with microwave power having a frequency that corresponds to an axial wavelength along the longitudinal axis of the microwave cavity. The axial wavelength is greater than a length of the preform material along the longitudinal axis. The method also includes heating the preform material within the microwave cavity by the microwave power and determining temperatures of the preform material at one or more locations on a surface of the preform material. The method further includes adjusting, based on the temperatures of the preform material, the microwave frequency to achieve substantially uniform heating at least on a sidewall of the preform material along the longitudinal axis by maintaining the axial wavelength of the microwave power to greater than the length of the preform material, which corresponds to substantially uniform electric field along the longitudinal axis of the microwave cavity.

In some embodiments, a dielectric spacer is inserted into the microwave cavity adjacent to the preform material to enhance the substantially uniform electric field, if the preform material has a non-uniform thickness or shape along the longitudinal axis.

In another aspect, a system for heating a dielectric preform material is provided. The system includes a microwave cavity configured to contain the preform material along a longitudinal axis of the microwave cavity and a microwave power source, in communication with the microwave cavity, for supplying microwave power to the microwave cavity to heat the preform material. The system also includes at least one controller configured to adjust a frequency of the microwave power in response to a change in the dielectric constant of the preform material during heating. Adjusting the frequency maintains an axial wavelength of the microwave power greater than a length of the preform along the longitudinal axis, thereby ensuring that electric field distribution in the microwave cavity along the length of the preform is substantially uniform. The system further includes a dielectric spacer inserted in the microwave cavity adjacent to the preform material to enhance the substantially uniform electric field distribution, if the preform material has a non-uniform thickness or shape along the longitudinal axis.

In other examples, any of the aspects above can include one or more of the following features. The microwave frequency can be between about 0.5 giga Hertz (GHz) and about 10 GHz. The microwave frequency can be between about 2.40 GHz and about 2.50 GHz. For example, the microwave power can be between about 100 Watts and about 3000 Watts.

In some embodiments, the microwave cavity is substantially cylindrical. The microwave frequency can be adjusted (e.g., by the at least one controller) to maintain the microwave frequency to be substantially the same as a cutoff frequency of the TM01 mode of the microwave cavity. The diameter of the microwave cavity can be between about 1 and about 100 cm. The diameter/radius of the microwave cavity can be varied along the longitudinal axis of the cavity in response to a variation of the geometry or property of the preform material (e.g., non-uniform thickness or shape along the longitudinal axis) to maintain the substantially uniform electric field distribution. For example, the microwave cavity can be constructed with varying cavity radii along the longitudinal axis to enhance the substantially uniform electric field, if the perform material has a non-uniform thickness along the longitudinal axis. The cavity radius can be increased where the thickness of the preform material is smaller and decreased where the thickness of the preform material is larger.

In some embodiments, the microwave cavity is rectangular if the preform material is approximately rectangular in shape.

In some embodiments, the dielectric spacer can be positioned adjacent to a closed end of the preform material to enhance electric field near the closed end.

In some embodiments, the temperatures of the preform material are determined by positioning two or more temperature sensors at the one or more locations along the length of the preform material and measuring the temperatures by the two or more temperature sensors. The temperature sensors can be spaced at equidistance along the preform material in the longitudinal axis.

In some embodiments, the at least one controller, in communication with the one or more temperature sensors and the microwave power source, is configured to adjust the frequency of the microwave power in response to the monitored temperature(s) to uniformly heat the preform material, thereby maintaining the substantially uniform electric field distribution. In some embodiments, the microwave frequency is adjusted by tuning the microwave frequency in response to a change in the temperatures of the preform material that is indicative of a change in a dielectric constant of the preform material during heating. In one example, the microwave frequency is decreased with an increase in the dielectric constant of the preform material to maintain the substantially uniform electric field. In another example, the microwave frequency is tuned based on a temperature gradient of the preform material during heating. The microwave frequency can be further tuned to deviate from the cutoff frequency for correcting non-uniformity in the temperatures at least on the sidewall of the preform material.

In some embodiment, the microwave power is coupled via at least one annular inlet positioned along the length of the microwave cavity. For example, the annular slit can be dimensioned to enable coupling of the microwave power to the microwave cavity to within a predetermined range of coupling efficiency. The microwave power source and the annular slit can be coupled with a coaxial cable.

In some embodiments, an electric field gradient is determined during heating based on electric field measurements taken at one or more locations in the microwave cavity. Based on the electric field gradient, the microwave frequency is adjusted (e.g., by the at least one controller) to maintain the substantially uniform electric field in the microwave cavity. In some embodiments, one or more electric field sensors are disposed within the microwave cavity to monitor the electric field within the cavity. The at least one controller, in communication with the one or more electric field sensors and the microwave power source, is configured to adjust the frequency of the microwave power in response to the monitored electric field to uniformly heat at least a sidewall of the preform material in the longitudinal axis by maintaining the substantially uniform electric field distribution. The one or more electric field sensors can comprise a plurality of electric field sensors spaced at equidistance along the preform material in the longitudinal axis.

In some embodiments, the microwave cavity includes at least one opening for inserting and removing the preform material. In some embodiments, a microwave choke is positioned outside of an opening of the microwave cavity to reduce leakage of the microwave power from the microwave cavity. In some embodiments, the microwave power source is a solid-state microwave generator.

In some embodiments, the microwave power is adjusted (e.g., by the at least one controller) to control a heating rate of the preform material, such as to maintain the heating rate of the preform material to within a predetermined range. In some embodiments, the microwave power is adjusted (e.g., by the at least one controller) to limit the electric field in the microwave cavity to below an air breakdown limit.

In some embodiments, based on at least one of the temperatures of the preform material or efficiency of microwave power absorption, the microwave power is adjusted to optimize at least one of a heating rate or energy efficiency.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the technology.

FIGS. 5a and b show exemplary electric field distributions along a preform in the microwave cavity of FIG. 1 without structural compensation for non-uniform preform thickness.

FIGS. 11a-c show an exemplary process for operating the control circuit implementation of FIG. 10.

DETAILED DESCRIPTION

Figure 1:
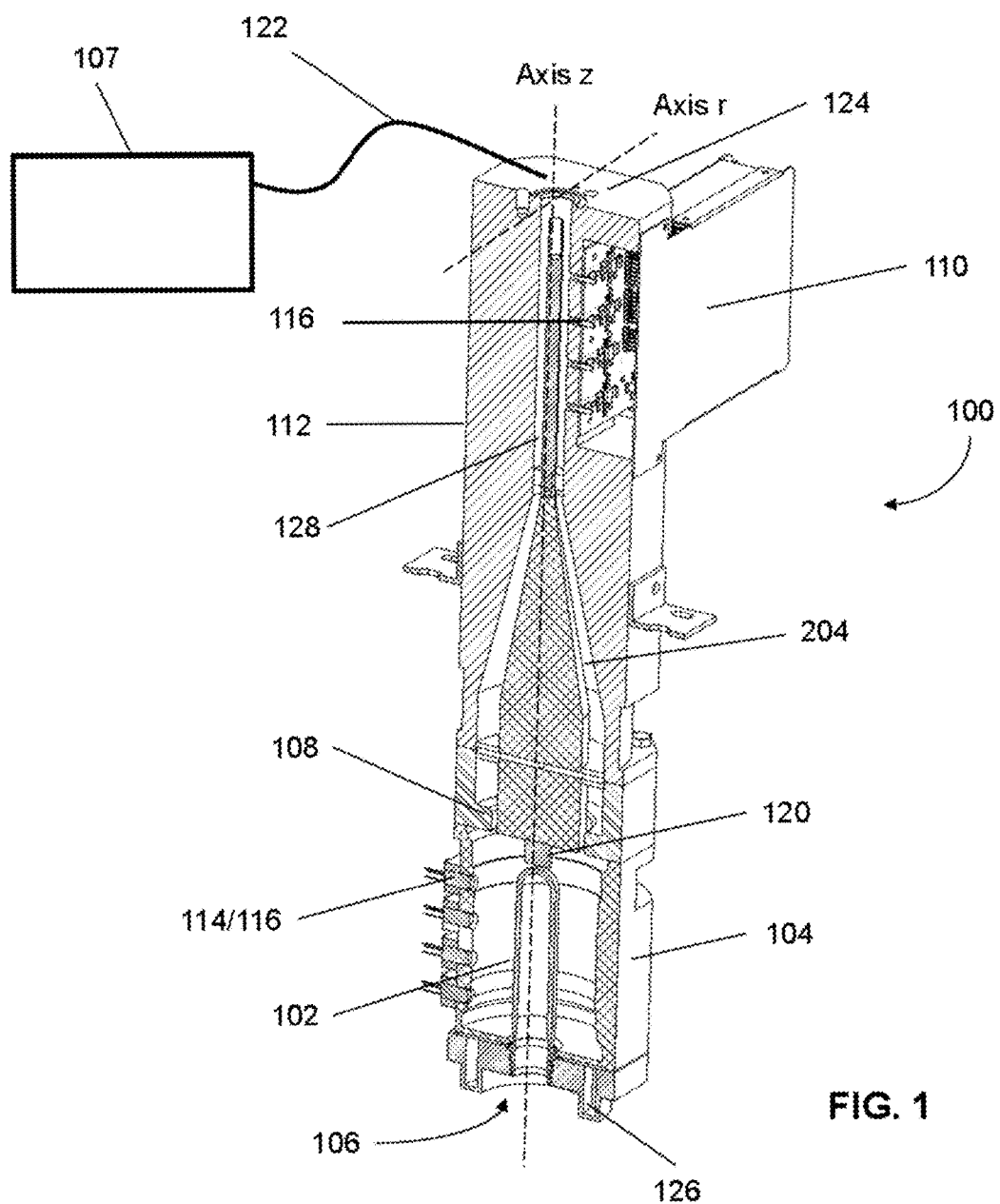
FIG. 1 shows a sectional view of an exemplary microwave heating system.

FIG. 1 shows a sectional view of an exemplary microwave heating system 100 configured to heat a preform 102 of a dielectric material, which is an insulating material that is a poor conductor of electric current. In some embodiments, the preform 102 is made of polyethylene terephthalate (PET). The heating system 100 includes a microwave cavity 104 configured to contain the preform 102. The microwave cavity 104 can be substantially cylindrical or rectangular in shape, depending on the shape of the preform 102. If the preform 102 is substantially cylindrical, a cylindrical microwave cavity 104 can be chosen to house the preform 102. If the preform 102 is substantially rectangular, a rectangular microwave cavity 104 can be chosen. As shown, the preform 102 is oriented along a longitudinal axis z in the microwave cavity 104. The axial length of the microwave cavity 104 in the direction of the longitudinal axis z can be about coextensive as the axial length of the preform material 102. In some embodiments, the axial length of the microwave cavity 104 is longer to ensure that it can accommodate the preform 102.

The microwave cavity 104 includes an opening 106 through which the preform 102 can be inserted and positioned. A microwave power source 107, such as a microwave power generator, can be positioned adjacent to the microwave cavity 104 and in communication with the microwave cavity 104 to supply microwave power to heat the preform 102 contained therein. In some embodiments, the microwave power supplied by the power source 107 is between about 100 Watts (W) and about 3000 Watts. For example, the microwave power can be about 800 W and about 1000 W. The frequency of the microwave power can be between about 0.5 gigaHertz (GHz) and about 10 GHz. In some embodiments, the frequency of the microwave power is between about 2.40 GHz and about 2.50 GHz.

As shown, the microwave cavity 104 can include an annular slit 108 in a ring-shaped geometry that defines an inlet for receiving the microwave power from the microwave power source 107. The microwave power source 107 and the annular slit 108 can be coupled via a transmission line 112 comprising, for example, a coaxial cable 122, a coaxial waveguide 128 and an expanding coaxial waveguide 204. In some embodiments, the annular slit 108 and the cavity opening 106 for receiving the preform 102 are on the opposite ends of the microwave cavity 104 and parallel to a radial axis r (i.e., substantially perpendicular to the longitudinal axis z). In some embodiments, a microwave choke 126 is positioned outside of the opening 106 to reduce leakage of the microwave power from the microwave cavity 104.

The microwave heating system 100 includes a control board 110 with one or more controllers (not shown) that are configured to automatically adjust parameters of the microwave power generated by the microwave power source 107 during heating. The control board 110 can make the power adjustment based on (i) a temperature profile on the preform 102 taken by one or more temperature sensors 114 (e.g., thermal sensors) disposed around the microwave cavity 104 and/or (ii) electric field in the microwave cavity 104 taken by one or more electric field sensors 116 (e.g., radio-frequency sensors) disposed around the microwave cavity 104. The temperature sensors 114 and/or the electric field sensors 116 can be positioned at openings on the side wall(s) of the microwave cavity 104 at about equidistance along the longitudinal axis z. In some embodiments, electric field sensors 116 are also located close to the transmission line 112 between the power source 107 and the annular slit 108 to measure properties associated with the transmission line 112, such as the voltage standing wave ratio (VSWR) of the transmission line 112.

Figure 2:
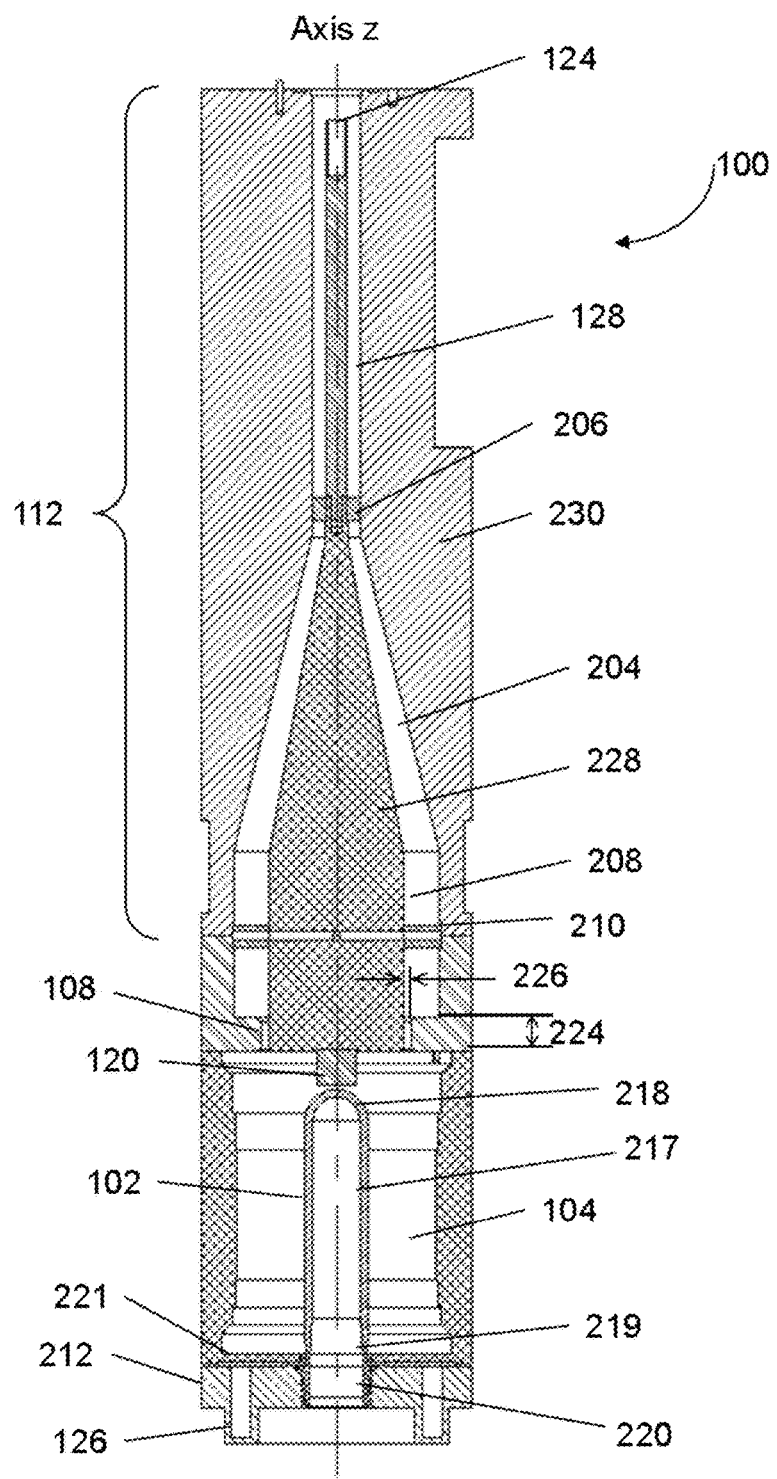
FIG. 2 shows a cross-sectional view of a portion of the microwave heating system of FIG. 1.

FIG. 2 shows a cross-sectional view of a portion of the microwave heating system 100 of FIG. 1. The transmission line 112, which couples the microwave power source 107 to the microwave cavity 104, can be divided into multiple sections. The first section 128 can be a ⅞-inch diameter coaxial waveguide coupled to a ⅞-inch diameter Electronic Industries Alliance (EIA) female connector 124 at its power inlet end. The second section 204 can be an expanding (or transitional) coaxial waveguide of varying thickness. The third section 208 can be a thicker coaxial waveguide configured for connection with the microwave cavity 104. All three sections include at least a portion of an inner conductor 228 and an outer conductor 230. The inner conductor 228 can be supported by dielectric materials, such as by two Polytetrafluoroethylene (PTFE) Teflon supports 206, 210. The spacing between the inner conductor 228 and outer conductor 230 can be filled with a solid dielectric material, such as oil, air, or an electronegative gas with a high breakdown voltage. The transmission line 112 can be designed to have a low reflection coefficient for microwave power of the desired operating frequency range (e.g., between about 0.5 GHz and about 10 GHz).

In some embodiments, the preform 102 in the microwave cavity 104 has a domed shape with a closed tip 218, a substantially cylindrical sidewall 217, a narrower cylindrical neck 219 and a threaded portion 220. The preform 102 may have a mass of about 45 grams (g) or less and an axial length (along the longitudinal axis z) of about 150 millimeter (mm) or less. If the preform 102 is substantially cylindrical, the microwave cavity 104 is also cylindrical with a diameter between about 1 centimeter (cm) and about 100 cm. In one example, the preform 102 is about 26 mm in diameter, about 134 mm in axial length, and 4 mm in thickness. The corresponding microwave cavity 104 is cylindrical and about 8.1 cm in diameter. The glass transition temperature of a PET material is between about 67 C and about 81 C. For stretching blow molding purposes, the desired temperature profile on a preform 102 can be (i) about 100 to 110 C in the cylindrical sidewall 217, where the temperatures are substantially uniformly on the sidewall 217 along the longitudinal axis z, (ii) below about 60 C. in the threaded portion 220 adjacent to the preform neck 219, and (iii) about 85 to 90 C. at the closed tip 218. The microwave heating system 100 can be used to achieve such a temperature profile.

A preform support 212 can be located substantially outside of the microwave cavity 104. The preform support 212 is configured to hold the preform 102 substantially parallel to the longitudinal axis z at the threaded portion 220 adjacent to the preform neck 219. The threaded portion 220 can be located outside of the microwave cavity 104 and is thus protected from being heated by the microwave in the cavity 104. The preform support 212 enables quick insertion and removal of the preform 102 to and from the microwave cavity 104, respectively. The preform support 212 can be interfaced at one end of the microwave cavity 104 where the opening 106 is located for inserting the preform 102. The microwave choke 126, such as a ¼ wavelength microwave choke, can be disposed within the preform support 212 to prevent leakage of microwave power from the cavity 104. To ensure proper operation of the microwave choke 126, a dielectric spacer 221 can be placed between the preform support 212 and the microwave cavity 104 to prevent electrical contact between the two components.

The microwave heating system 100 of FIGS. 1 and 2 can provide substantially uniform heating of the dielectric preform 102 such that the temperature of the preform 102 is relatively uniform along the longitudinal axis z on the sidewall 217 during the heating process. In general, power absorption in a dielectric material can be expressed as:

$$P = \frac{1}{2}\varepsilon''(T)\omega E^2, \quad \text{(Equation 1)}$$

where P is the microwave power dissipation per unit volume of the material, ∈"(T) is the dissipation factor of the material, ω is the angular frequency, and E is the electric field. As can be seen from Equation 1, substantially uniform electric field E and substantially uniform dissipation factor ∈"(T) result in substantially uniform power absorption P by a dielectric preform, which can ensure uniform heating of the preform, at least along the sidewall 217. Since the dissipation factor ∈"(T) of a PET material is an increasing function of temperature, in some embodiments, the temperature profile of a PET preform 102 is kept uniform along the sidewall 217 during a heating process to prevent thermal runaway in the preform 102.

The following equations show how uniform electric field E can be achieved by a cylindrical microwave cavity 104. The axial electric field of a TM01 mode along the longitudinal axis z ($E_z$) and the radial electric field of the TM01 mode along the radial axis r ($E_r$) in the microwave cavity 104 are expressed by the equations:

$$E_z = E_0 J_0\left(\rho_{01}\frac{r}{a}\right)e^{-j\beta z} \quad \text{(Equation 2)}$$

$$E_r = -\frac{j a \beta}{\rho_{01}} E_0 J_0'\left(\rho_{01}\frac{r}{a}\right)e^{-j\beta z} \quad \text{(Equation 3)}$$

$$\beta = \sqrt{\omega^2 \varepsilon_r(T)\varepsilon_0 \mu - \left(\frac{\rho_{01}}{a}\right)^2}, \quad \text{(Equation 4)}$$

where $\beta$ is the propagation constant, $\in_r(T)$ is relative permittivity (dielectric constant) of the medium, $\in_0$ is the permittivity of free space, $\mu$ the permeability of the medium, $p_{01}$=2.405 is the first root of $J_0(r)$=0, and a is the radius of the microwave cavity 104. The cutoff frequency of the cylindrical microwave cavity 104 is the frequency at which the propagation constant $\beta$ equals to 0, at which the axial wavelength of the microwave becomes infinite in the direction along the longitudinal axis z. At the cutoff frequency, the axial electric field $E_z$ is a function of cavity radius only and is uniform along the longitudinal axis z, while the radial electric field ($E_r$) becomes 0, as expressed in the equations below:

$$E_z = E_0 J_0\left(\rho_{01}\frac{r}{a}\right) \quad \text{(Equation 5)}$$

$$E_r = 0 \quad \text{(Equation 6)}.$$

Based on these equations and given that the largest dimension of the dielectric preform 102 is often the axial length in the longitudinal axis z, the heating system 100 can operate at or close to its cutoff frequency of the TM01 mode of the microwave cavity 104 (i.e., generate an axial wavelength greater than the axial lengths of the preform 102 and/or the microwave cavity 104) to ensure that the electric field distribution in the preform 102 and/or the microwave cavity 104 are substantially uniform, which permits uniform heating of the substantially cylindrical sidewall 217 of the preform 102 in the microwave cavity 104. For the closed tip 218 of the preform 102, uniform cavity electric field may not be sufficient to heat the closed tip 218 to the desired temperature due to dielectric polarization and its geometry, as will be discussed below, despite that the desired temperature at the closed tip 218 (e.g., about 85 to 90 C) is typically lower than that at the sidewall 217 (e.g., about 110 to 110 C.). In some embodiments, the microwave cavity 104 has a cutoff frequency of the TM01 mode at about 2.45 GHz.

Given that the preform 102 fills partially the internal volume of the microwave cavity 104, an effective relative dielectric constant $\in_r(T)$ of the cavity can be introduced. The value of the effective relative dielectric constant $\in_r(T)$ is between the dielectric constants of air and the dielectric preform material, and it increases as the dielectric constant of the preform material increases or when the thickness of preform material increases. The cutoff condition of the microwave cavity, $\beta$=0, can be expressed as:

$$\omega_{cutoff} = \frac{\rho_{01}}{a\sqrt{\varepsilon_r(T)\varepsilon_0 \mu}}. \quad \text{(Equation 7)}$$

When the frequency of the microwave power deviates from the cutoff frequency of Equation 7, the electric field along the longitudinal axis z of the microwave cavity 104 becomes non-uniform. For example, if the microwave frequency is below the cutoff frequency of the cavity 104, the amplitudes of the microwave field attenuate or decrease from the location where the microwave is launched into the cavity 104. If the microwave frequency is above the cutoff frequency, the microwave can propagate in the cavity 104 and the amplitude of the microwave field can either increase or decrease from the location where the microwave is launched, depending on the wavelength of the microwave and the structure of the cavity 104. These properties can be used to control the temperature profile on a dielectric preform 102 when correction of temperature non-uniformity along the sidewall 217 of the preform 102 is needed.

Because the dielectric constant of the preform 102 changes with temperature, the frequency for maintaining the cutoff condition (Equation 7) shifts during a heating process. For example, when the temperature of the preform 102 rises, the dielectric constant $\in_r(T)$ is adapted to increase, which may lead to a decrease in the cutoff frequency of the microwave cavity 104. In some embodiments, systems and methods are developed to tune one or more parameters of the microwave power generated by the microwave power source 107 to maintain the microwave frequency at about the cutoff condition of the TM01 mode of the microwave cavity 104, thus ensuring that the axial wavelength of the microwave power is greater than the axial length of the preform 102, despite changes of dielectric properties in the microwave cavity 104. This ensures that the axial electric field $E_z$ is substantially uniform (and the radial electric field $E_r$ is close to 0), which maintains uniform heating of the preform sidewall 217 during the heating process.

Figure 3A:
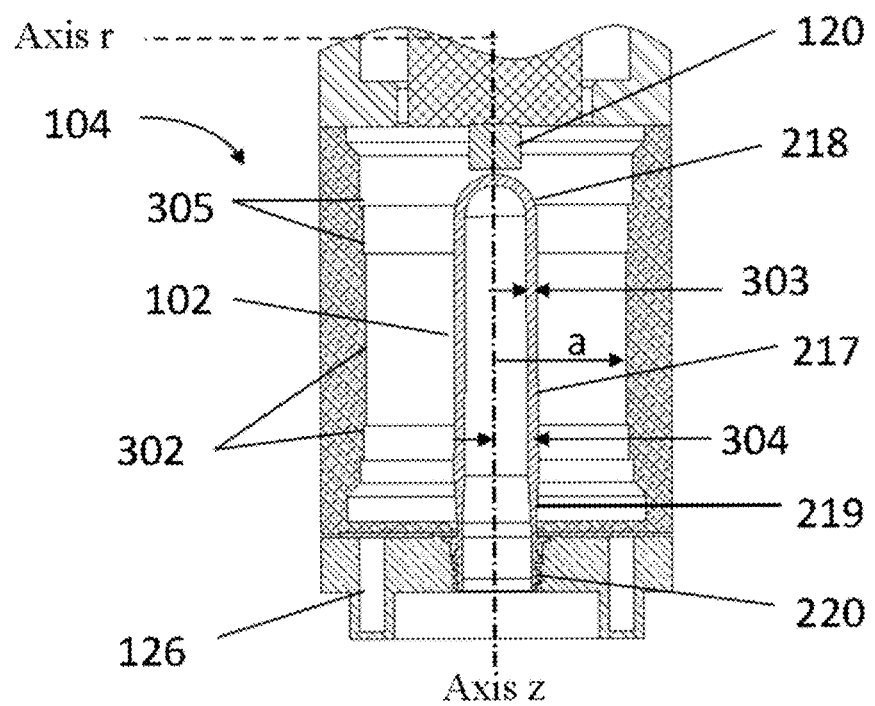
FIGS. 3a and b show exemplary microwave cavity configurations for the microwave heating system of FIGS. 1 and 2.
Figure 3B:
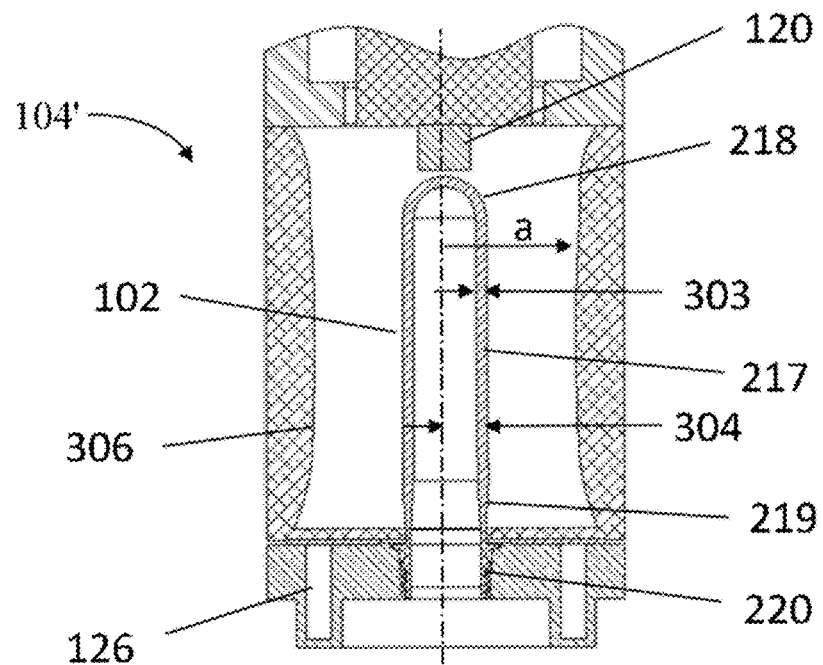

FIGS. 3a and b show exemplary microwave cavity configurations for the microwave heating system 100 of FIGS. 1 and 2, where each microwave cavity has a non-constant radius a in the radial direction r to accommodate any non-uniformity in the shape and/or thickness of the preform 102 when it is placed inside of the cavity 104. Specifically, FIG. 3a shows a detailed view of the microwave cavity 104 of FIGS. 1 and 2, where the microwave cavity 104 has a step-wise contoured sidewall 302 comprising multiple steps 305 to accommodate changes in the shape or thickness of the preform 102 along the longitudinal axis z. FIG. 3b shows another exemplary microwave cavity 104' with a contoured sidewall 306 that has a smooth curve. Both of the microwave cavity designs 104, 104' of FIGS. 3a and b can accommodate heating of a preform 102 that has an irregular shape. For example, the closed tip 218 of the preform 102 can have a substantially spherical shape and the neck 219 adjacent to the threaded portion 220 of the preform 102 can vary in thickness along the axial length z. The sidewall 217 of the preform 102 can also vary in radius 304 and/or radial thickness 303 along the axial length z.

In the case where the radial thickness 303 of the preform sidewall 217 is non-uniform along the longitudinal axis z, the effective relative dielectric constant $\in_r(T)$ varies based on the thickness 303. For example, if the thickness 303 of the preform sidewall 217 increases, the effective relative dielectric constant also increases and vice versa. As indicated in Equation 4, as the dielectric constant $\in_r(T)$ increases, radius a of the microwave cavity 104 or 104' is decreased to maintain the cutoff condition of the TM01 mode. Thus, the radius a of the microwave cavity 104 or 104' is generally inversely related to the radial thickness 303 of the preform sidewall 217.

In the case where the radius 304 of the preform sidewall 217 is non-uniform along the longitudinal axis z, the contoured sidewall 302 of the microwave cavity 104 or the contoured sidewall 306 of the microwave cavity 104' can be suitably dimensioned to maintain a constant cutoff frequency along the longitudinal axis z of the microwave cavity and therefore a substantially uniform electric field within the preform sidewall 217. As indicated in equation 5, the electric field $E_z$ along the preform sidewall 217 is a function of the ratio of the preform radius 304 to the cavity radius a. Thus, to maintain a substantially uniform electric field along the preform sidewall 217, this ratio needs to be maintained substantially constant. For example, if the radius 304 of the preform sidewall 217 increases, the radius a of the microwave cavity 104 or 104' is increased to ensure uniform heating of the preform sidewall 217. Alternatively, one or more components can be inserted in the microwave cavity 104 or 104' to maintain the constant ratio without altering the actual structure of the cavity.

Figure 4A:
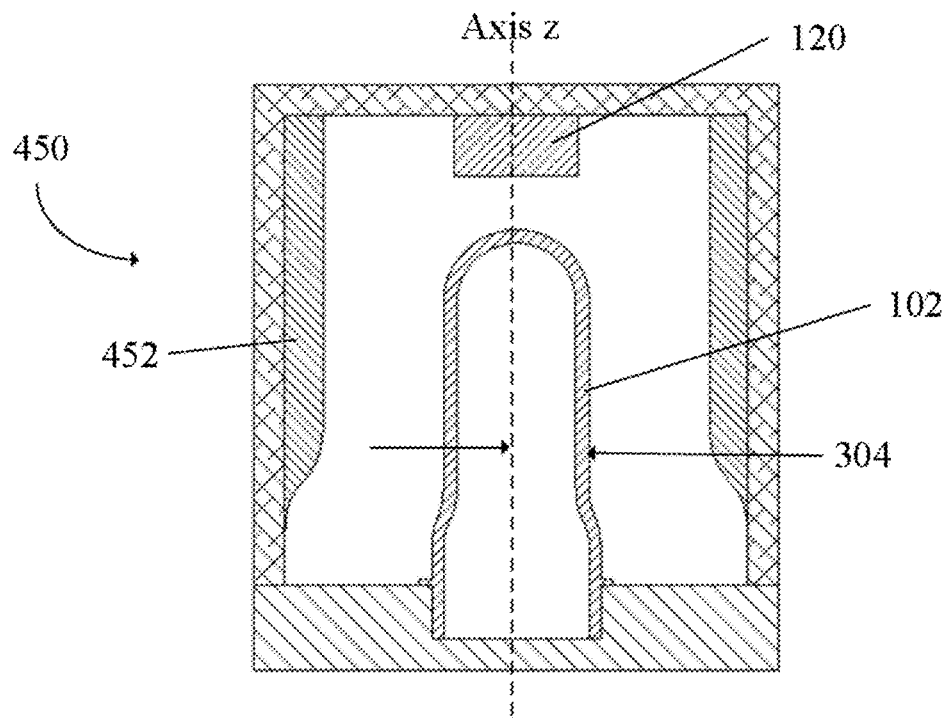
FIGS. 4a and b show an exemplary microwave cavity with one or more components inserted therein at various locations for improving heating uniformity of a preform.
Figure 4B:
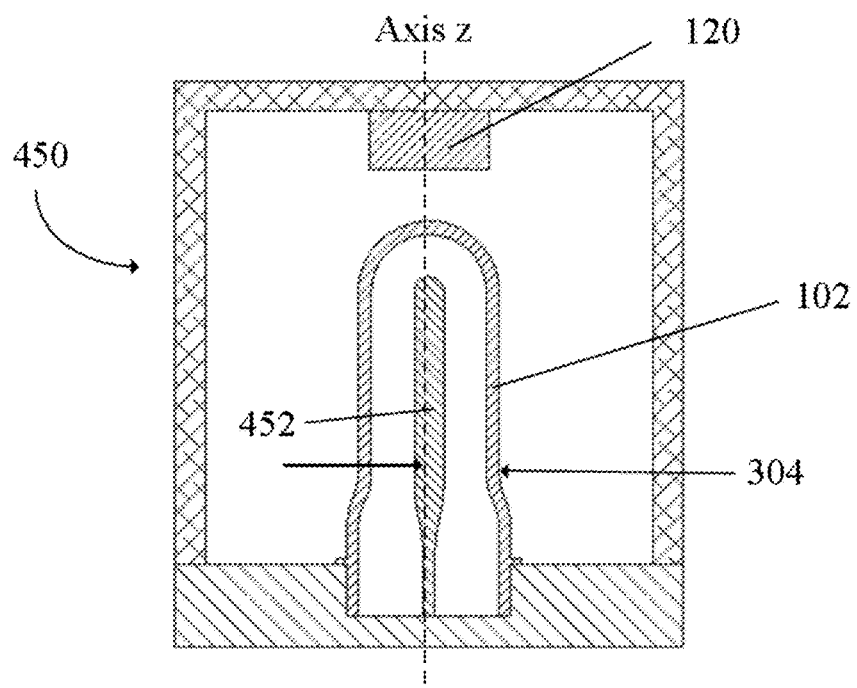

FIGS. 4a and b show an exemplary microwave cavity 450 with one or more components inserted therein at various locations to improve heating uniformity of the preform 102. As shown, a contoured dielectric liner 452 with a shape complementary to the preform 102 can be positioned in the microwave cavity 450 and concentrically aligned with the longitudinal axis z to compensate for the geometric and/or material variations of the preform 102. Usage of the dielectric liner 452 ensures that uniform electric field can be maintained along the longitudinal axis z. The dielectric liner 452 can be made of a material with low microwave absorption, such as quartz, sapphire, Teflon, and/or a ceramic material. The dielectric liner 452 can be located in the microwave cavity 450 either outside of the preform 102, as shown in FIG. 4a, or inside of the preform 102, as shown in FIG. 4b. The dielectric liner 452 can have a complementary geometry relative to the preform 102 so that the cutoff frequency along the longitudinal axis z of the microwave cavity 452 remains approximately constant. For example, as illustrated in FIGS. 4a and b, the liner 452 generally follows the contour of the preform 102 such that it is thicker in the radial direction r where the radius 304 of the preform sidewall 217 is smaller and thinner where the radius 304 is larger.

In some embodiments, when the cut-off condition of Equation 7 cannot be satisfied along the longitudinal axis z of the preform 102, additional heating steps may be required to preferentially heat the under-heated areas. For example, the microwave frequency can be shifted away from the cutoff frequency of the microwave cavity to deliver power to an under-heated area, if an undesirable temperature profile is observed on the preform 102 (e.g., a non-uniform temperature profile is observed on the preform sidewall 217).

In some embodiments, as shown in FIGS. 1-4, a dielectric spacer 120 is positioned adjacent to the closed end 218 of the preform 102 in the microwave cavity 104, 104' or 450. The dielectric spacer 120 can increase local electric field near the closed end 218 where the electric fields in the preform material is lowered due to dielectric polarization of the material. FIGS. 5a and b show exemplary electric field distributions of the preform 102 in the microwave cavity 104 of FIG. 1 without structural compensation for non-uniform preform thickness. As illustrated in FIG. 5a, with a cavity electric field $E_0$ in the direction of the longitudinal axis z of the microwave cavity 104, even when a uniform axial electric field in the TM01 mode is established inside of the microwave cavity 104, the electric field in the closed tip 218 is lower than the electric field in the sidewall 217 due to dielectric polarization of the preform material. This is because the sidewall 217 of the preform 102 in the direction of the longitudinal axis z is long and narrow, while the wall of the closed tip 218 of the preform 102 is relatively short and wide along the longitudinal axis z. As the preform material is polarized under the electric field $E_0$, the polarization charges, located at the opposite ends of the preform surfaces along the direction of the electric field, creates an electric field in the opposite direction of the electric field $E_0$ in the preform material. As illustrated in FIG. 5a, in the sidewall 217 of the preform 102, the amount of polarization charges are less and are separated further apart relative to those in the closed end 218. This results in less field cancellation in the preform material in the sidewall 217 than that in the closed end 218. These effects are also specified in the boundary conditions of electric fields at a dielectric interface, where the electric field components tangential to the interface are continuous ($E_{t1}=E_{t2}$) while the electric field components perpendicular to the interface are discontinuous ($E_{n1}=(\in_2/\in_1)E_{n2}$). Considering that the dielectric constants of air and the preform material are about 1 and 3, respectively, electric field reduction at the closed end 218 can be significant. As shown in FIG. 5b, power absorption at the closed tip 218 is about 50% of that in the sidewall 217 of the preform 102 despite that the original electric field $E_0$ is higher along the longitudinal axis z than that at the outer radius of the microwave cavity 104.

Figure 6C:
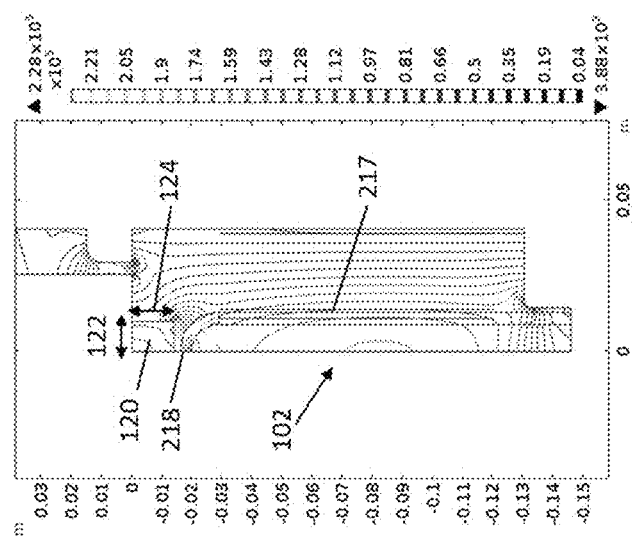
FIGS. 6a-c show exemplary electric field distributions along a preform in the microwave cavity of FIG. 1 when a dielectric spacer is positioned adjacent to the closed tip of the preform to enhance electric field distributions.
Figure 6A:
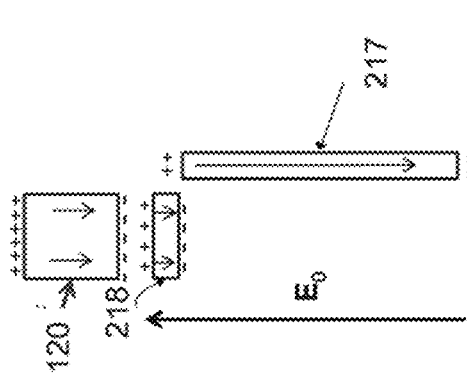
Figure 6B:
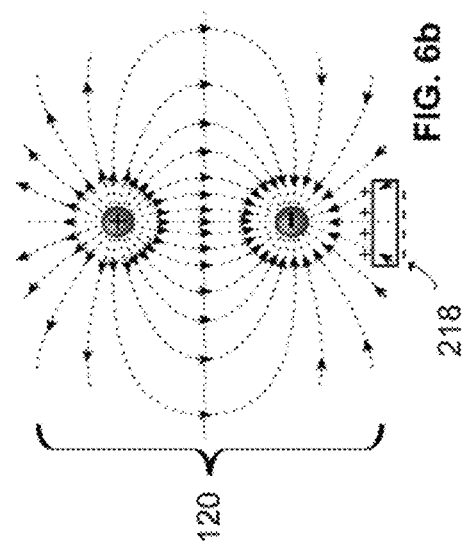

FIGS. 6a-c show exemplary electric field distributions of the preform 102 in the microwave cavity 104 of FIG. 1 when the dielectric spacer 120 is positioned adjacent to the closed tip 218 to enhance electric field at the tip 218. As shown in FIG. 6a, adding a piece of dielectric material, such as the dielectric spacer 120, next to the closed tip 218 along the longitudinal axis z puts polarization charge of the dielectric spacer 120 near the closed tip 218. As shown in FIG. 6b, the direction of the electric field generated by the dielectric spacer 120 is opposite to the direction of the original electric field $E_0$ within the dielectric spacer 120, while it is substantially in the direction of the original electric field $E_0$ outside of the dielectric spacer 120. With a sufficiently high dielectric constant material, a sufficiently strong electric field can be created by the dielectric spacer 120 to enhance the electric field in the closed end 218 positioned nearby. In some embodiments, the spacer 120 is made of a material with low dielectric loss, such as quartz, sapphire, PTFE, other plastic materials, a ceramic material, or a high dielectric constant material such as quartz, sapphire or tantalum oxide. In some embodiments, the spacer 120 is substantially cylindrical. A diameter 122 of the spacer 120 along the radial axis r is approximately the same as the inner diameter of the preform 102. The axial length 124 of the spacer 120 along the longitudinal axis z is selected based on the dielectric constant of the spacer 120 and the desired electric field enhancement (e.g., desired temperature and/or heating rate) at the closed tip 218. As shown in FIG. 6c, power absorption at the closed tip 218 is about 78% of that in the sidewall 217 of the preform 102 when a quartz dielectric spacer 120 is positioned adjacent to and axially aligned with the closed tip 218. In this example, the desired temperature profile of the preform is at or below 90 C. at the closed end 218 and at or below 110 C. in the sidewall 127. The preform 102 is about 26 mm in diameter, about 134 mm in axial length, and about 4 mm in thickness. The diameter 122 of the quartz dielectric spacer 120 is about 16.4 mm and its axial length 124 is about 13.5 mmm. In alternative embodiments, a spacer in the form of a dielectric rod or tube can be inserted in the preform 102 to enhance the electric field at the closed tip 218.

In another aspect, as described above with reference to Equation 7, because the dielectric constant $\in_r(T)$ of the dielectric preform 102 changes with temperature, the frequency for maintaining the cutoff condition ($\beta=0$) shifts during a heating process. In some embodiments, systems and methods are developed to tune one or more parameters of the microwave power generated by the microwave power source 107 to maintain the microwave frequency at about the cutoff condition of the TM01 mode of the microwave cavity 104, thus ensuring that the axial wavelength of the microwave power is greater than the axial length of the preform 102, despite changes of dielectric properties in the microwave cavity 104. This further ensures that the axial electric field $E_z$ is substantially uniform (and the radial electric field $E_r$ is close to 0), which maintains substantially uniform heating of the preform sidewall 217 during the heating process. Generally, energy efficiency and heating uniformity are interrelated and the relationship can be optimized through controlling of certain microwave parameters (e.g., frequency and/or output power). In some embodiments, because process parameters (e.g., inlet temperatures and/or size of the preform 102) can vary and precise control of the heating process is needed, the heating system 100 can use in situ measurements to determine the changes in the microwave cavity 104 so that one or more microwave parameters can be adjusted in real time or near real time to achieve a relatively constant electric field, thereby relatively uniform temperature, at least along the preform sidewall 217.

Figure 7:
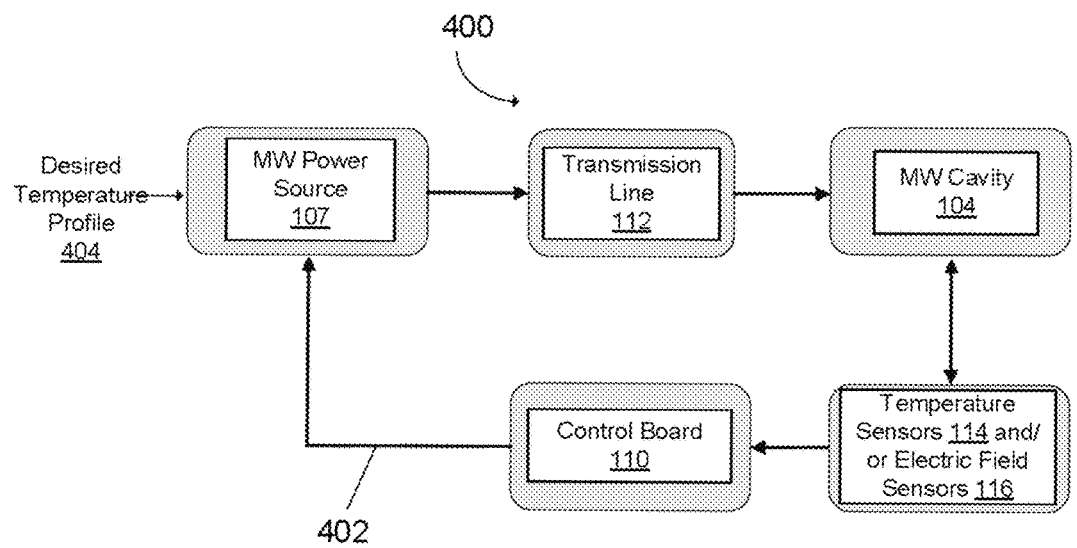
FIG. 7 shows an exemplary control circuit of the microwave heating system of FIG. 1.

FIG. 7 shows an exemplary control circuit 400 of the heating system 100 of FIG. 1. The control circuit 400 includes the microwave power source 107 (e.g., a solid state microwave generator) connected to the microwave cavity 104 via the transmission line 112. The microwave power source 107 is adapted to launch microwave into the microwave cavity 104 via the transmission line 112. One or more sensors are disposed on the microwave cavity 104 to monitor cavity/preform properties. For example, one or more temperature sensors 114 (e.g., four temperature sensors 114) are disposed on a sidewall of the microwave cavity 104, such as at equidistance from each other, to measure temperatures of the preform 102 in the microwave cavity 104 at particular locations, thereby establishing an actual temperature profile of the preform 102 during the heating process. In some embodiments, one or more electric field sensors 116 (e.g., three electric field sensors 116) are disposed on the sidewall of the microwave cavity 104, such as at equidistance from each other, to measure the electric field (E) in the microwave cavity 104 at particular locations, thereby establishing an electric field distribution and electric field gradient (dE/dz) of the microwave cavity 104 during the heating process. Additional electric field sensors 116 can be coupled to the transmission line 112 close to the microwave power source 107 to determine properties associated with the transmission line 112. The temperature sensors 114 and/or the electric field sensors 116 are in communication with the control board 110 to feed temperature and/or electric field data to the control board 110. In some embodiments, additional information, such as power absorption/reflection of the microwave cavity 104, is also supplied to the control board 110. Based on the received data, the control board 110 can adjust, in a feedback loop 402, parameters of the microwave power generated by the power source 107 such that the microwave power remains at the cutoff frequency of the microwave cavity 104 during the heating process. In addition, as the preform 102 is heated in the microwave cavity 104, dielectric constant of the preform material changes and the cutoff frequency of the microwave cavity 104 changes. The control board 110 can calculate a cutoff frequency based on the measured temperatures of the preform 104 and set the microwave source 107 to operate at this desired frequency. This allows uniform temperature and/or electric field to be maintained in the microwave cavity 104, even when dielectric properties change in the cavity 104 with change in temperature during the heating process. The adjustable microwave power parameters include microwave frequency, power level and duration at each heating step. The control board 110 can control hardware and/or software components to make adjustments to the microwave power parameters. The control board 110 can adjust the microwave power parameters automatically and continuously (or periodically) in real time (or in near real time).

In some embodiments, non-uniform temperatures along the sidewall 217 of the preform 102 can be detected and corrected, even after the operating frequency is set to the cutoff frequency. For example, when temperature non-uniformity is observed on a preform sidewall 217, the actual temperature profile can be represented in a first order approximation as $$T_0(z) \cong T_0 + \frac{\partial T_0}{\partial z} \cdot z.$$

the control circuit 400 can shift the microwave frequency relative to the cutoff frequency to compensate the temperature non-uniformity with a desired power absorption density profile:

$$p(z) \cong P_0 + \frac{\partial P}{\partial z} z, \qquad \text{(Equation 8)}$$

where z represents a position along the longitudinal axis z. For example, following a heating duration of $\Delta t$, the temperature distribution along the sidewall 217 of the preform 102 can be represented by the following equation:

$$T_1(z) \cong \left(T_0 + \frac{P_0 \Delta t}{c_P \rho}\right) + \left(\frac{\partial T_0}{\partial z} + \frac{\Delta t}{c_P \rho} \frac{\partial P}{\partial z}\right) z, \qquad \text{(Equation 9)}$$

where $T_0$ represents the temperature in the preform 102 at beginning of the heating duration $\Delta t$, $P_0$ represents the power absorption density at position of z=0 on the preform 102, $\rho$ is the mass density of the preform 102, and $c_P$ is the specific heat capacity of the preform 102 at constant pressure. According to Equation 9, to eliminate temperature non-uniformity along the sidewall 217, the desired power density profile (8) can be appropriately formulated such that:

$$\left(\frac{\partial T_0}{\partial z} + \frac{\Delta t}{c_P \rho} \frac{\partial P}{\partial z}\right) = 0. \quad \text{(Equation 10)}$$

In some embodiments, the desired temperature profile heats the preform 102 at or below about 60 C. in the neck region 219, at or below 90 C. at the closed end 218 and at or below 110 C. on the sidewall 127. As shown in the exemplary embodiments, the desired temperature profile can be realized by proper design and operation of the microwave cavity, for example, by positioning the dielectric spacer 120 near the closed end 218 of preform 102 (as shown in FIGS. 1-3), contouring the sidewall of the microwave cavity (as shown in FIGS. 3a and b), adding a cavity liner (as shown in FIGS. 4a and b) and/or controlling the microwave parameters such as frequency and power during a heating process.

Figure 8:
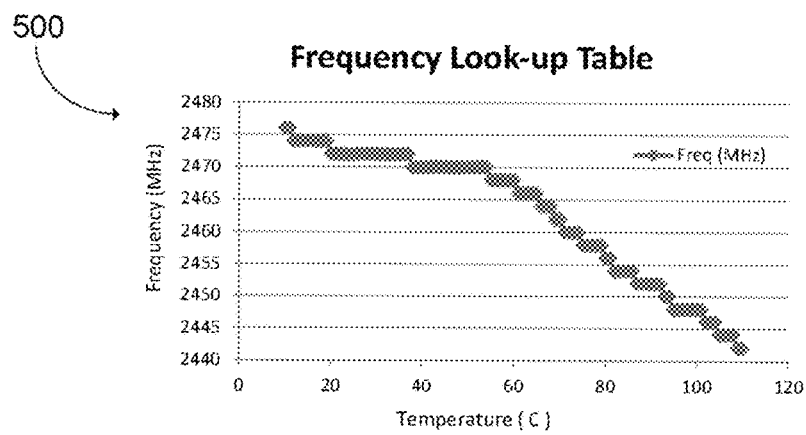
FIG. 8 shows the plot of an exemplary lookup table that the control circuit of FIG. 7 can use to set the operating frequency for heating a PET preform.

The control circuit 400 can receive a desired temperature profile 404 as an input and adjust the frequency of the microwave power to achieve the desired temperature profile 404, where the desired temperature profile at least specifies that the temperature along the sidewall 217 of the preform 102 needs to be substantially uniform and within a target temperature range. In some embodiments, the control board 110 determines the desired frequency to achieve this temperature profile by referencing a lookup table. FIG. 8 shows a plot of an exemplary lookup table 500 that the control board 110 of FIG. 7 can use to set the operating frequency as a function of temperature of a PET preform. The PET preform weighs about 35 grams and has a 3.15-mm thick sidewall. As shown, in the case where the dielectric preform 102 has a dielectric constant that increases with temperature (e.g., a PET preform), the control board 110 can decrease the microwave frequency as the preform temperature increases to maintain the cutoff or near-cutoff condition. The temperature used to select the desired operating frequency can be temperature measured by at least one of the temperature sensors 114 (e.g., a minimum temperature) or an average of two or more of the temperature measurements. In some embodiments, the control board 110 can set the operating frequency according to a mathematical formula, such as:

$$f \cong f_{cutoff}(T_{average}) + k \frac{\partial T}{\partial z}, \quad \text{(Equation 11)}$$

where $T_{average}$ is the average of the temperature measurements obtained by two or more of the temperature sensors 114, $f_{cutoff}(T)$ is the cutoff frequency of the microwave cavity including a dielectric preform material with a temperature-varying dielectric constant, $\partial T/\partial z$ is temperature gradient on the preform 102, and k is a proportional constant or a function of temperature that can compensate for an observed temperature gradient $\partial T/\partial z$. In some embodiments, the control board 110 can set the operating frequency according to another mathematical formula that takes into account of temperature gradient on the preform material as well as the energy absorption efficiency ($\eta$) of the cavity:

$$f \cong f_{cutoff}(T_{average}) + \Delta f\left(T_{average}, \frac{\partial T}{\partial Z}, \eta\right) \quad \text{(Equation 12)}$$

Generally, taking energy absorption efficiency ($\eta$) into consideration allows further optimization of temperature uniformity and energy efficiency of the heating process.

In some embodiments, if an electric field gradient, calculated based on the measurements taken by two or more of the electric field sensors 116, is not substantially uniform along the z-axis on the sidewall 217 of a preform 102, then the control board 110 corrects the observed non-uniformity by adjusting the frequency of the microwave power source 107 to be closer to the cutoff condition of the TM01 mode. In general, electric field uniformity in the microwave cavity 104 is indicative of uniformity of preform heating. Hence, if the electric field distribution lacks uniformity, the control board 110 can adjust the frequency of the microwave power source 107 to ensure that the microwave frequency is close to the cutoff condition, thereby preserving the substantially uniform electric field distribution. For example, if the electric field intensity decreases along the microwave cavity from the location where the microwave is launched, the frequency of microwave can be increased to make the electric field distribution more uniform. Moreover, when microwave frequency is adjusted (e.g., deviating from the cutoff frequency) to correct non-uniformity in temperature on a preform sidewall, measurement of electric field distribution in the cavity can give more precise control of the electric field profile during the heating. Unlike temperature, which can change on a slower time scale, electric fields can change almost instantly and can be measured at a much faster rate. Hence, combining electrical and thermal measurements, although not necessary, allows more precise and faster control of a heating process than performing control based on measuring temperature alone.

In addition to microwave frequency, the control board 110 can also set the microwave power generated by the microwave source 107 to control a heating rate of the preform 102 and limit the electric field in the microwave cavity 104 to below an air breakdown limit. In general, the microwave power dissipation density per unit volume of preform (P) is expressed as:

$$P = \rho C_p \left(\frac{dT}{dt}\right), \quad \text{(Equation 13)}$$

where $\rho$ is the mass density of the preform 102, V is the volume of the preform 102, $C_P$ is the specific heat capacity of the preform 102 at constant pressure, and dT/dt is heating rate in degrees per second. The above relationship shows that heating rate is proportional to microwave power. Because a preform is heated typically in air, the maximum heating rate is limited by air breakdown in the microwave cavity. The electric field intensity in a cavity depends on both the level of input microwave power and power absorption in the preform. The control board 110 can thus set the power of the microwave power source 107 to control the heating rate of the preform 102, which is advantageous because this limits the electric field in the preform 102 to below the air breakdown limit when power absorption by the preform 102 is low.

In another aspect, the annular slit 108 of the heating system 100 (as shown in FIGS. 1 and 2) is dimensioned to facilitate tuning of the microwave frequency. Specifically, The annular slit 108 can be appropriately dimensioned to enable the microwave power source 107 to be well coupled to the microwave cavity 104 such that the microwave power generated by the source 107 can be delivered into the microwave cavity 104 to within a predetermined range of coupling efficiency. In a typical impedance matching network with a given microwave frequency, at least two adjustable variables are required as both the amplitude and phase of the load impedance need to be matched. When microwave frequency changes during preform heating to accommodate changes in the dielectric properties of the preform material, impedance matching becomes more difficult. The duration of preform heating is typically within a few seconds. This makes the use of motor-driven tuning elements of an impedance matching network impractical. Therefore, a broadband, fixed impedance matching network is desired.

Using the heating system 100 as an example, as microwave cavity 104 is maintained closely at the cutoff condition of the TM01 mode, the electromagnetic field structure in the microwave cavity 104 is nearly stationary during a heating process. Under such a condition, a fixed tuner can cover a certain range of microwave frequencies effectively. The design of the annular slit 108 as an impedance matching element can be performed using a microwave simulation software that takes into account of the variations of dielectric constant and microwave absorption of the preform material during heating. The annular slit 108, with an axial height 224 and a width 226, can be dimensioned to match the impedance of the microwave cavity 104 close to the center frequency for preform heating. The annular slit 108 can be positioned at an end of the microwave cavity 104, aligned coaxially to the longitudinal axis z of the cavity 104 as shown in FIGS. 1 and 2. Alternatively, the annular slit 108 can be coupled to the microwave cavity 104 around its outer diameter (not shown). Coupling microwave power from a large radius, where the cavity electric field is lower, helps to reduce the electric field in the matching element and in the microwave transmission line 112. When simulating the matching network over the possible frequency range used for preform heating, the dimensions of the annular slit 108, such as its axial height 224, width 226 and/or radial location relative to the cavity 104, can be readjusted so that the overall energy efficiency of the preform heating process is maximized. In an exemplary design, the axial height 224 of the annular slit 108 is about 12 mm and its width 226 is about 3.5 mm for a microwave cavity of 40.5 mm in radius and 135 mm in length. The diameter of the preform 102 is approximately 26 mm with a thickness of 3.15 mm and a length of about 140 mm.

Figure 9:
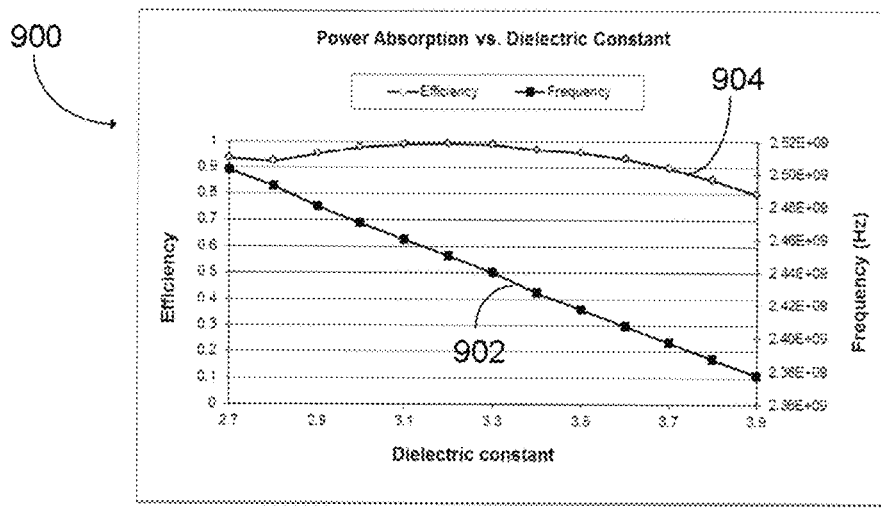
FIG. 9 shows simulated power absorption efficiency in a PET preform as the dielectric constant of the preform changes during a heating process in the microwave cavity of FIG. 1.

FIG. 9 shows simulated power absorption efficiency in a PET preform 102 as the dielectric constant of the PET preform 102 changes during a heating process in the microwave cavity 104 of FIG. 1. As explained above, the dielectric constant of the PET preform 102, as well as the dissipation factor $\in''$, tend to increase when the preform temperature increases during heating. Thus, to maintain the cutoff frequency of the microwave cavity 104, the microwave frequency is decreased as the dielectric constant increases, as demonstrated by line 902. In such a case, the average power absorption efficiency, using the annular slit 108 as a fixed matching element, is about 90% when integrated over the range of the dielectric constants, as demonstrated by line 904.

Figure 10:
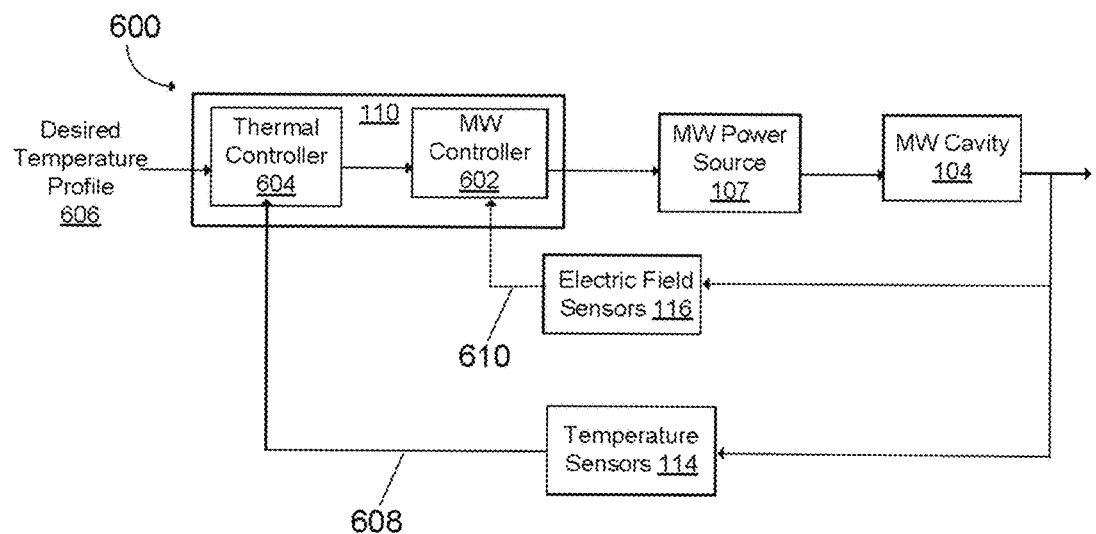
FIG. 10 shows an exemplary implementation of the control circuit of FIG. 7.

FIG. 10 shows an exemplary implementation 600 of the control circuit 400 of FIG. 7. The control board 110 can include a plurality of controllers, including a microwave controller 602 and a thermal controller 604. The circuit implementation 600 includes two feedback control loops—an outer control loop 608 formed by the thermal controller 604, the microwave controller 602, the microwave power source 107, the microwave cavity 104 and the temperature sensors 114, and an inner control loop 610 formed by the microwave controller 602, the microwave power source 107, the microwave cavity 104 and the electric field sensors 116. The outer control loop 608 can adjust the operating frequency based on one or more temperature measurements as described above, and the inner control loop 610 can adjust the operating frequency and microwave power based on one or more electric field measurements, as described above. The inner control loop 610 can operate at higher speed, for example, with cycle time (or response time) in the range of 1 microsecond to tens of milliseconds, while the cycle time of the outer loop 608 can be between tens to hundreds of milliseconds due to slower change in the preform temperature. The inner control loop 610 is optional and in certain embodiments is eliminated from the control circuit implementation 600.

Figure 12A:
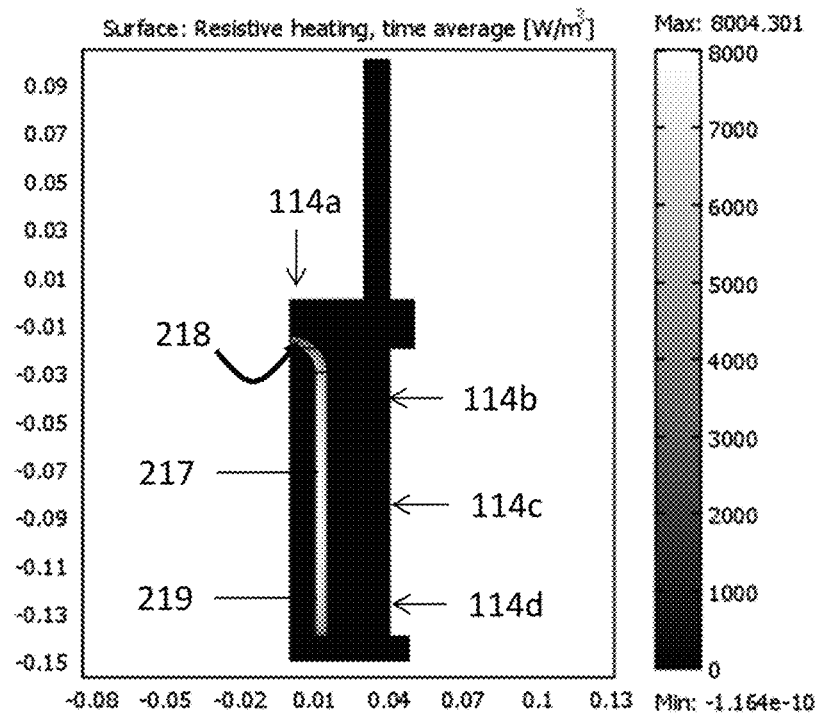
FIGS. 12a and b show exemplary placement of temperature and electric field sensors, respectively, in the microwave heating system of FIG. 1.
Figure 12B:
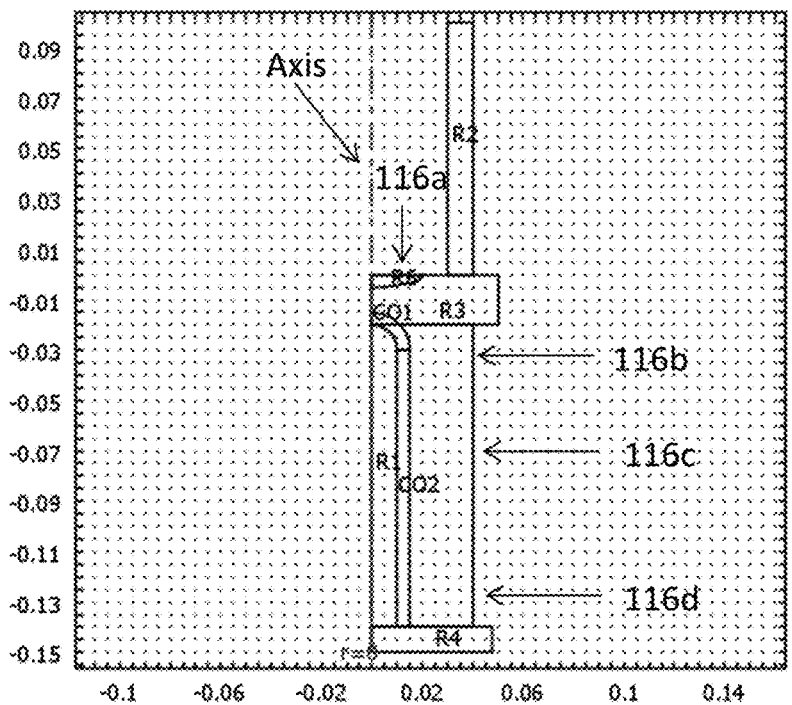

FIGS. 11a-c show an exemplary process for operating the control circuit 600 of FIG. 10 to adjust the operating frequency such that the cutoff condition of the microwave cavity 104 is achieved. For this example, there are four temperature sensors 114a-d positioned around the microwave cavity 104, as shown in FIG. 12a, with temperature sensor 114a providing a measurement of T4 closest to the tip 218 and temperature sensors 114b, c and d providing measurements of T2, T3 and T4, respectively, along the sidewall 217. Similarly, FIG. 12b shows an exemplary placement of four electric field sensors 116a-d positioned along the longitudinal length of the microwave cavity 104.

In FIG. 11a, the process 800a starts at step 802, where an initial frequency is set (e.g., at 2.5 GHz), along with one or more adjustment parameters (e.g., frequency increment of 1 MHz, threshold temperatures of 90 C. and 105 C., and a temperature uniformity parameter of 5%). The temperatures of the preform 102 is then measured (step 804) using the temperature sensors 114a-d of FIG. 12a, and the initial actual temperature profile of the preform 102 is stored. The average temperature of the preform along the sidewall 217 (e.g., an average of T1, T2 and T3) is compared with the threshold temperature $T_a$ of 105 C., and the temperature of the preform 102 at the closed end 218 (T4) is compared with the threshold temperature $T_b$ of 90 C. (step 805). If the thermal controller 604 determines that the temperatures measured by the temperature sensors are equal or above their respective threshold temperatures, the parameter adjustment process ends since the desired temperature profile is already achieved (step 810). Alternatively, if the thermal controller 604 determines that the temperatures measured by the temperature sensors are below their respective thresholds, the thermal controller 604 proceeds to step 806 to calculate the temperature uniformity of the preform sidewall 217 along the longitudinal axis z. The temperature uniformity calculated at step 806 is compared with the temperature uniformity threshold in step 808, which in this particular example is $\Delta T/T_{ave}=5\%$, where $T_{ave}$ represents the average of temperatures on the sidewall 217 and $\Delta T$ is the largest difference among temperatures T1, T2 and T3 on the side wall 217. The ratio $\Delta T/T_{ave}$ is used to determine if correction of non-uniform temperature of the preform is needed. At step 808, if the temperatures along the sidewall 217 are more uniform than the temperature uniformity threshold, control proceeds to process 800b of FIG. 11b, in which case the microwave frequency is set at the cutoff frequency of the microwave cavity 104. Alternatively, if the temperatures lack uniformity, control proceeds to process 800c of FIG. 11c, in which the microwave frequency is adjusted to deviate from the cutoff frequency of the microwave cavity 104.

During the process 800b, the thermal controller 604 sets the microwave frequency as the cutoff frequency of the microwave cavity 104 (step 812) to achieve the desired temperature profile and temperature uniformity along the preform sidewall 217. The cutoff frequency can be determined based on the measured temperatures of the preform 102 and the corresponding dielectric constant of the preform material at such temperatures. For example, the cutoff frequency can be obtained from the predetermined lookup table 500 of FIG. 8 or using the mathematical formula of Equation 11 or 12. At step 812, the thermal controller 604 can also set the microwave power based on the measured temperatures of the preform 102 and the corresponding dielectric absorption of the preform material at such temperatures, as described above. The heating process subsequently proceeds for a preset duration (step 814), such as about 50 milliseconds. During the preset time period, the microwave frequency can either remain at the pre-calculated cutoff frequency, or alternatively, be adjusted by the microwave controller 602 based on the electric field measurements by the electric field sensors 116 (steps 815, 816, 818). To make such a determination, the microwave controller 602 calculates the differences in electrical field measurements taken by the electric field sensors 116 (step 815) along the preform sidewall 217 and determines if the differences are sufficiently close to zero for uniform heating of the preform sidewall 217 (step 816). If the electric field gradient, or the differences among consecutive electric field measurements along the z axis on the sidewall 217, is too large for uniform heating of the preform 102, the microwave controller 602 can adjust the microwave frequency to increase the uniformity of the electric fields (step 818). The frequency increment is sometimes limited by the frequency resolution of the microwave source 107, which in this example is about 1 MHz due to the particular microwave source used. If the electric field along the longitudinal axis of the preform sidewall 217 is sufficiently uniform (as determined by step 816), the microwave controller 602 does not adjust the existing frequency and the process 800b is repeated at step 814. If the electric field along the preform 102 is non-uniform, the microwave controller 602 adjusts the frequency (step 818), such as increases or decreases the frequency by an amount set by the frequency increment, and repeats the process 800a at step 814. Because changes in the electric field can be measured almost instantly, the steps in process 800b can proceed at a rate as fast as the processor allows, for example, at a cycle time of a millisecond or less. At the end of the preset heating time period for process 800b (step 814), the control returns to step 804 of process 800a where temperatures of the preform 102 is again measured.

During the process 800c, the thermal controller 604 (i) sets the microwave frequency as the cutoff frequency of the microwave cavity 104 to achieve the desired temperature profile and temperature uniformity along the preform sidewall 217 and (ii) corrects the cutoff frequency to compensate for observed non-uniformity of temperatures along the preform sidewall 217 by deviating from the cutoff frequency of the microwave cavity 104 by a calculated amount. Specifically, at step 822, the thermal controller 604 determines the cutoff frequency according to the average temperature of the preform 102 and the corresponding dielectric constant of the preform material at such temperatures. The cutoff frequency can be obtained from a predetermine lookup table 500 or a mathematical function as represented by Equation 11 or 12. In some embodiments, the microwave power is also set according to the measured temperatures of the preform 102 and the corresponding dielectric absorption of the preform material at such temperatures, as described above. In addition, an initial correction to the cutoff frequency, df, is calculated based on the preform temperature and temperature gradient according to Equation 10, to correct the non-uniformity in the measured temperature profile. The heating process subsequently proceeds for a preset duration (step 824), such as about 20 milliseconds. During the preset time period, the microwave frequency can either remain at the pre-calculated cutoff frequency (including the initial correction), or alternatively, be adjusted by the microwave controller 602 based on the electric field measurements by the electric field sensors 116. To make such a determination, the microwave controller 602 calculates the differences in electrical field measurements taken by the electric field sensors 116 (step 815) along the preform sidewall 217 (step 825) and determines if the differences are sufficient to correct for the temperature non-uniformity (step 826). If the electric field gradient, such as the differences among consecutive electric field measurements along the z axis on the sidewall 217, is too large or too small for correcting the temperature non-uniformity on the preform (step 826), the microwave controller 602 can adjust the microwave frequency to decrease or increase the electric field gradient (step 828). If the electric field gradient along the preform 104 is about at correct values (step 826), the microwave controller 602 does not adjust the existing frequency and the process 800c is repeated at step 824. At the end of the preset heating time period for process 800c, the control returns to step 804 of process 800a so that the heating process continues until the preform 102 reaches the desired temperature profile while ensuring that the temperatures along the preform sidewall 217 are substantially uniform.

Figure 13:
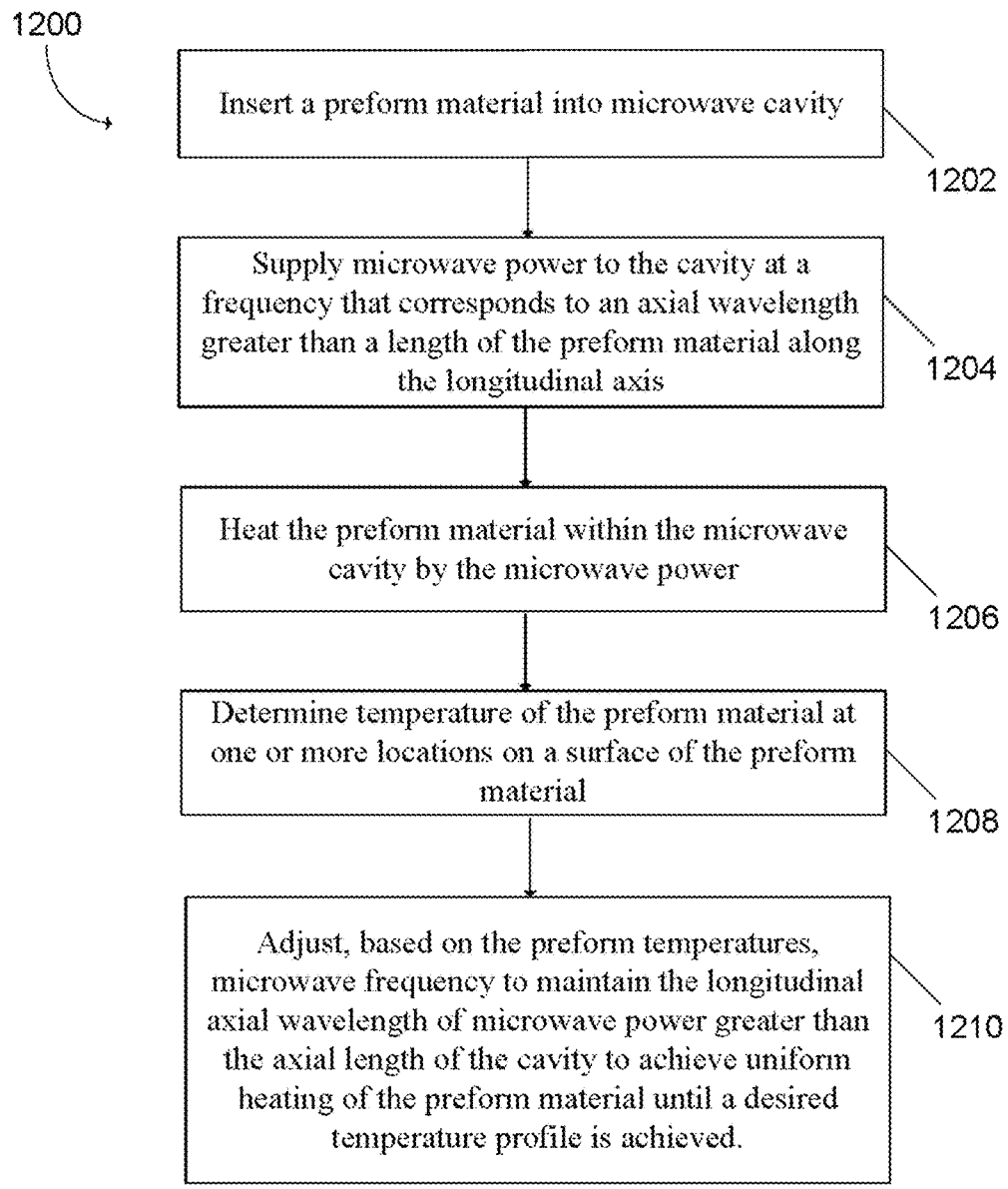
FIG. 13 shows an exemplary process for heating a preform using the microwave heating system of FIGS. 1 and 2.

FIG. 13 shows an exemplary process 1200 for heating a preform (e.g., the preform 102) using the microwave heating system 100 of FIGS. 1 and 2. The preform 102 is first inserted into the microwave cavity 104 along the longitudinal axis z of the microwave cavity 104 (step 1202). Microwave power having a frequency that corresponds to an axial wavelength greater than a length of the preform material 104 along the longitudinal axis z is supplied to the microwave cavity (step 1204). The preform 102 within the microwave cavity 104 is heated by the microwave power, resulting in changes in its dielectric properties as temperature increases (step 1206). The temperature of the preform material 102 at one or more locations on a surface of the preform material 102 is measured (step 1208). The frequency of the microwave source 107 is then adjusted, based on the temperature of the preform material 102, such that the microwave frequency remains at or corrected from the cutoff frequency of the microwave cavity 104. The adjustment maintains the axial wavelength of the microwave power to greater than the length of the preform material 102 to achieve/maintain substantially uniform heating along the sidewall 217 of the preform material 102 (step 1210). For example, the frequency can be adjusted using the processes 800a-c of FIGS. 11a-c. The frequency adjustment continues during the heating until the temperatures of the preform material reach a desired temperature profile (step 1210).

Figure 14A:
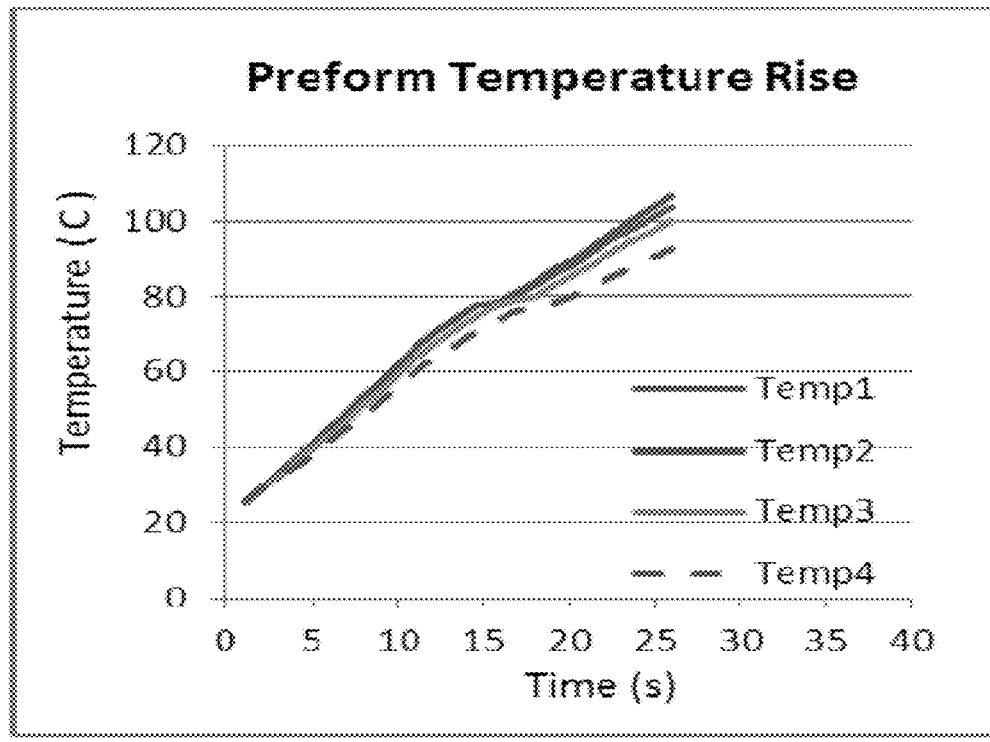
FIGS. 14a and b show, for an exemplary heating process, preform temperature progression and measured temperature distribution around a preform, respectively, after frequency is adjusted using the processes of FIGS. 11a-c and 13.
Figure 14B:
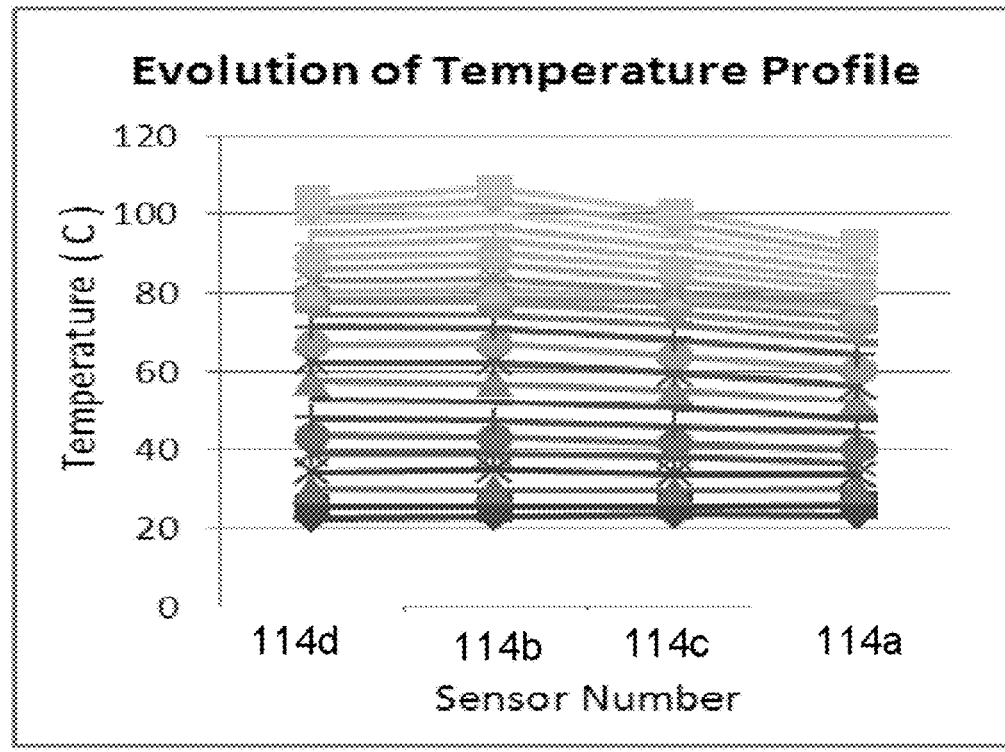

FIGS. 14a and b show, for an exemplary heating process, preform temperature progression and measured temperature distribution around a preform 102, respectively, after frequency is adjusted using the processes 800a-c and 1200 of FIGS. 11a-c and FIG. 13. As illustrated in FIG. 14a, as heating duration increases, the average temperature of a dielectric preform 102 tends to rise, which affects the dielectric constant $\in_r(T)$ of the preform 102, and in turn the frequency for maintaining the cutoff condition in the microwave cavity 104, where the frequency tends to decrease for a dielectric preform, as shown in FIG. 8. Using the process 800a-c, the control circuit 600 can suitably adjust the operating frequency and/or microwave power such that cut-off or near cut-off condition is maintained and temperature uniformity (or near uniformity) along the sidewall 217 of the preform 102 is achieved at each temperature level. For example, as illustrated in FIG. 14b, the temperature measurements obtained at sensors 114b-114d (exemplary placement of which are shown in FIG. 12a) are nearly uniform as temperature increases, with a variation of at most 4 C. on the sidewall 217 of the preform. In addition, the final temperature at the preform sidewall 217 is about 102 C. and the temperature at the closed end 218 is about 90 C., as needed in a desired temperature profile for stretch-blow of a preform. For this example, energy absorption by the preform 102 is about 70%.

In some embodiments, the size, materials and/or initial temperature of the preform, in addition to the microwave power source 107 for heating the preforms are controlled by the heating system of the present invention. The temperature change in the preforms during heating, from one preform to the next, can be highly repeatable. Under such conditions, the frequency and power of the microwave source 107 can be set in a predetermined time sequence, with little or no feedback from the temperature sensors 114 and/or electric sensors 116. Omission of some of the sensors can help reduce the cost of the heating system. Because the dielectric properties of the preform material change during the heating process, the microwave frequency and power can follow about the same time trajectories as when the sensors are present.

In exemplary operations of the heating system 100, the preform 102 can have a mass of about 35 g and an axial length of up to about 140 mm. The diameter of the microwave cavity 104 can be about 110 mm or less. Microwave power of about 800 to 1000 W can be supplied to heat the preform 102 while the preform 102 is stationary. In some embodiments, a heating rate of less than 5 seconds for a preform 102 of about 24 g can be achieved. In some embodiments, an energy efficiency of 50% or higher can be achieved for a PET preform 102. In some embodiments, a microwave absorption efficiency of about 85% to about 90% is achieved. In some embodiments, a desired preform temperature profile is less than about 60 C. below the neck region 219, at or below 110 C. in the straight sidewall section 217, and at or below 90 C. at the closed end 219.

Figure 15:
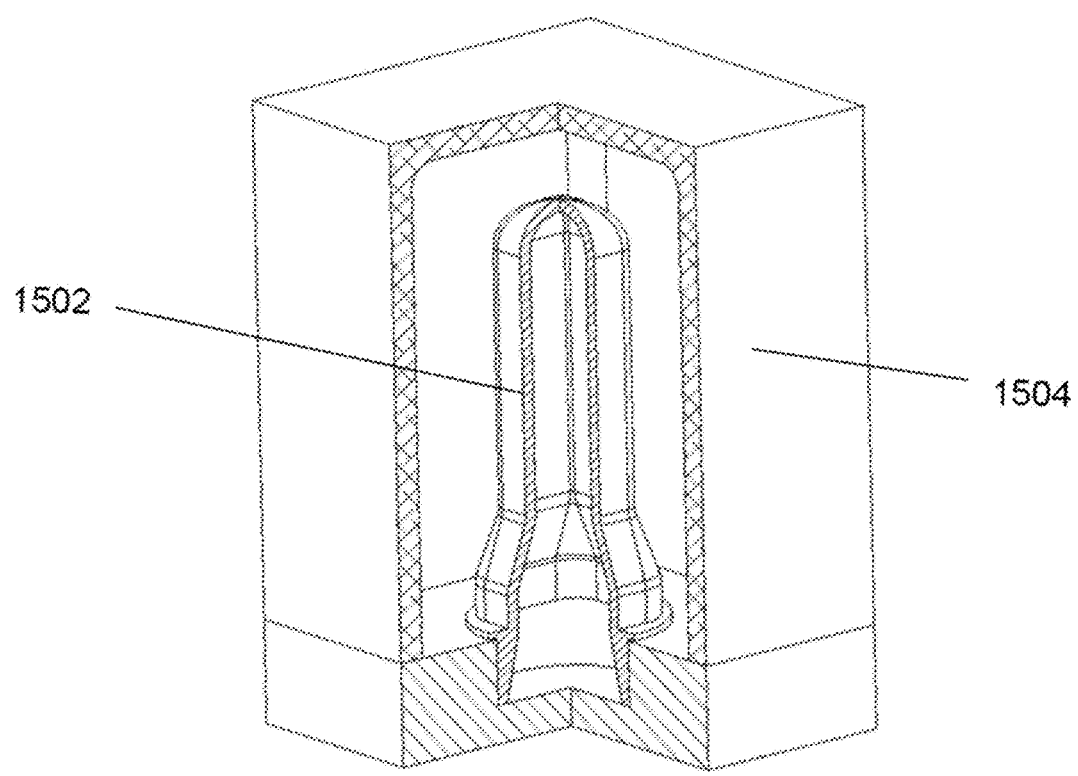
FIG. 15 shows an exemplary rectangular microwave cavity for heating a substantially rectangular preform.

In some embodiments, the microwave cavity is rectangular in shape, if the preform is approximately rectangular in shape. FIG. 15 shows a substantially rectangular-shaped microwave cavity 1504 for heating a substantially rectangular preform 1502. In such a case, electromagnetic field principles for a rectangular waveguide, similar to equations 1-6 for a cylindrical waveguide, can be applied to determine a cutoff frequency of the TE11 mode of the rectangular microwave cavity 1504 to ensure that the axial wavelength of the microwave power is greater than the axial length of the preform 1502. Similarly, the control board 110 can automatically adjust the microwave frequency and/or microwave power in response to a change in the dielectric constant $\in_r(T)$ of the preform 1502 to maintain uniform electric field and/or heating of preform at least along the preform sidewall in the rectangular microwave cavity 1504.

While the invention has been particularly shown and described with reference to specific embodiments, it should be understood by those skilled in the art that various changes in form and detail may be made therein without departing from the spirit and scope of the invention as defined by the appended claims.

What is claimed is:

1. A method for heating a dielectric preform material, the method comprising:
   inserting the preform material into a microwave cavity along a longitudinal axis of the microwave cavity;
   supplying the microwave cavity with microwave power having a frequency that corresponds to an axial wavelength along the longitudinal axis of the microwave cavity, the axial wavelength greater than a length of the preform material along the longitudinal axis;
   heating the preform material within the microwave cavity by the microwave power; and
   during the heating, performing steps including:
      determining temperatures of the preform material at one or more locations on a surface of the preform material; and
      adjusting, in response to a change in the temperatures of the preform material, the microwave frequency to achieve uniform heating at least on a sidewall of the preform material along the longitudinal axis, the adjusting of the microwave frequency based on the change in the temperatures adapted to maintain the axial wavelength of the microwave power to greater than the length of the preform material, which corresponds to uniform electric field and uniform heating along the longitudinal axis of the microwave cavity.

2. The method of claim 1, wherein adjusting the microwave frequency comprises maintaining the microwave frequency to be the same as a cutoff frequency of the TM01 mode of the microwave cavity.

3. The method of claim 1, further comprising inserting a dielectric spacer into the microwave cavity adjacent to the preform material to enhance the uniform electric field, if the preform material has a non-uniform thickness along the longitudinal axis.

4. The method of claim 1, further comprising constructing the microwave cavity with varying cavity radii along the longitudinal axis to enhance the uniform electric field, if the perform material has a non-uniform thickness or shape along the longitudinal axis.

5. The method of claim 4, further comprising increasing the cavity radius where the thickness of the preform material is smaller and decreasing the cavity radius where the thickness of the preform material is larger.

6. The method of claim 1, wherein determining the temperatures of the preform material comprises:
   positioning two or more temperature sensors at the one or more locations along the length of the preform material; and
   measuring the temperatures by the two or more temperature sensors.

7. The method of claim 1, wherein adjusting the microwave frequency comprises tuning the microwave frequency in response to the change in the temperatures of the preform material, which causes a change in a dielectric constant of the preform material during heating.

8. The method of claim 7, wherein adjusting the microwave frequency comprises decreasing the microwave frequency with an increase in the dielectric constant of the preform material to maintain the uniform electric field.

9. The method of claim 1, wherein adjusting the microwave frequency comprises tuning the microwave frequency based on a temperature gradient of the preform material during heating.

10. The method of claim 1, further comprising coupling the microwave power via at least one annular inlet positioned along the length of the microwave cavity.

11. The method of claim 1, further comprising determining, during heating, an electric field gradient based on electric field measurements taken at one or more locations in the microwave cavity; and adjusting, based on the electric field gradient, the microwave frequency to maintain the uniform electric field in the microwave cavity.

12. The method of claim 1, further comprising positioning a microwave choke outside of an opening of the microwave cavity to reduce leakage of the microwave power from the microwave cavity.

13. The method of claim 1, further comprising adjusting the microwave power to maintain a heating rate of the preform material to within a predetermined range.

14. The method of claim 1, wherein the microwave frequency is between 2.40 giga Hertz (GHz) and 2.50 GHz.

15. The method of claim 1, wherein the microwave power is between 100 Watts and 3000 Watts.

16. The method of claim 1, further comprising adjusting, based on at least one of the temperatures of the preform material or efficiency of microwave power absorption, the microwave power to optimize at least one of a heating rate or energy efficiency.

17. The method of claim 2, further comprising tuning the microwave frequency to deviate from the cutoff frequency for correcting non-uniformity in the temperatures at least on the sidewall of the preform material.

18. The method of claim 1, further comprising positioning a dielectric spacer adjacent to a closed end of the preform material to increase electric field near the closed end.

* * * * *